US011561767B2

(12) United States Patent
Gope et al.

(10) Patent No.: US 11,561,767 B2
(45) Date of Patent: *Jan. 24, 2023

(54) MIXED-PRECISION COMPUTATION UNIT

(71) Applicant: Arm Limited, Cambridge (GB)

(72) Inventors: Dibakar Gope, Austin, TX (US); Jesse Garrett Beu, Austin, TX (US); Paul Nicholas Whatmough, Cambridge, MA (US); Matthew Mattina, Boylston, MA (US)

(73) Assignee: Arm Limited, Cambridge (GB)

( * ) Notice: Subject to any disclaimer, the term of this patent is extended or adjusted under 35 U.S.C. 154(b) by 332 days.

This patent is subject to a terminal disclaimer.

(21) Appl. No.: 16/836,117

(22) Filed: Mar. 31, 2020

(65) Prior Publication Data
US 2021/0089889 A1 Mar. 25, 2021

Related U.S. Application Data

(60) Provisional application No. 62/905,486, filed on Sep. 25, 2019.

(51) Int. Cl.
*G06F 7/483* (2006.01)
*G06N 3/063* (2006.01)
(Continued)

(52) U.S. Cl.
CPC ............ *G06F 7/483* (2013.01); *G06F 7/5443* (2013.01); *G06N 3/04* (2013.01); *G06N 3/063* (2013.01); *G06N 3/08* (2013.01)

(58) Field of Classification Search
CPC .......................... G06N 3/063; G06F 9/30014
See application file for complete search history.

(56) References Cited

U.S. PATENT DOCUMENTS 6,771,094 B1 * 8/2004 Langhammer ...... G06F 15/7867
708/650
2018/0052661 A1 * 2/2018 Langhammer .......... G06F 7/485
(Continued)

FOREIGN PATENT DOCUMENTS

WO    2021012148 A1    1/2021

OTHER PUBLICATIONS

Abadi et al., TensorFlow: Large-scale machine learning on heterogeneous distributed systems. CoRR, abs/1603.04467, 2016.
(Continued)

*Primary Examiner* — Michael J Metzger
(74) *Attorney, Agent, or Firm* — Leveque Intellectual Property Law, P.C.

(57) ABSTRACT

The present disclosure advantageously provides a mixed precision computation (MPC) unit for executing one or more mixed-precision layers of an artificial neural network (ANN). The MPC unit includes a multiplier circuit configured to input a pair of operands and output a product, a first adder circuit coupled to the multiplier circuit, a second adder circuit, coupled to the first adder circuit, configured to input a pair of operands, an accumulator circuit, coupled to the multiplier circuit and the first adder circuit, configured to output an accumulated value, and a controller, coupled to the multiplier circuit, the first adder circuit, the second adder circuit and the accumulator circuit, configured to input a mode control signal. The controller has a plurality of operating modes including a high precision mode, a low precision add mode and a low precision multiply mode.

20 Claims, 25 Drawing Sheets

(51) Int. Cl.
*G06N 3/08* (2006.01)
*G06F 7/544* (2006.01)
*G06N 3/04* (2006.01)

(56) References Cited

U.S. PATENT DOCUMENTS

| | | | |
|---|---|---|---|
| 2018/0341495 | A1 | 11/2018 | Culurciello et al. |
| 2019/0079729 | A1* | 3/2019 | Aimone ................ G06F 17/16 |
| 2019/0325301 | A1 | 10/2019 | Wang et al. |
| 2020/0134461 | A1* | 4/2020 | Chai ...................... G06N 3/088 |

OTHER PUBLICATIONS

Aghasi et al., Net-Trim: Convex pruning of deep neural networks with performance guarantee. In Advances in Neural Information Processing Systems 30: Annual Conference on Neural Information Processing Systems 2017, Dec. 4-9, 2017, Long Beach, CA, USA, pp. 3180-3189, 2017.

Alemdar et al., Ternary neural networks for resource-efficient AI applications. CoRR, abs/1609.00222, 2016.

Cai et al., Deep learning with low precision by half-wave gaussian quantization. In 2017 IEEE Conference on Computer Vision and Pattern Recognition, CVPR 2017, Honolulu, HI, USA, Jul. 21-26, 2017, pp. 5406-5414, 2017. doi:10. I 109/CVPR.2017.574.

Andri et al., YodaNN : An architecture for ultra-low power binary-weight CNN acceleration. IEEE Transactions on Computer-Aided Desi gn of Integrated Circuits and Systems, 37(1):48-60, Jan. 2018. ISSN 0278-0070. doi: 10.1109/TCAD.2017.2682138.

Chen et al., Dadiannao: A machine-learning supercomputer. In Proceedings of the 47th Annual IEEE/ACM International Symposium on Microarchitecture, MICRO-47, pp. 609-622, Washington, DC, USA, 2014. IEEE Computer Society. ISBN 978-1-4799-6998-2. doi: 10.1109/MICRO.2014.58.

Chen et al., Encoder-decoder with atrous separable convolution for semantic image segmentation. In Computer Vision—ECCV 2018—15th European Conference, Munich, Germany, Sep. 8-14, 2018, Proceedings, Part VII, pp. 833-851, 2018. doi: 10.1007/978-3-030-01234-2 \ -49.

Chen et al., MXNet: A flexible and efficient machine learning library for heterogeneous distributed systems. CoRR, abs/1512.01274, 2015.

Courbariaux et al., BinaryConnect: Training deep neural networks with binary weights during propagations. In Advances in Neural Information Processing Systems 28: Annual Conference on Neural Information Processing Systems 2015, Dec. 7-12, 2015, Montreal, Quebec, Canada, pp. 3123-3131, 2015.

David R. Lutz. Arm floating point 2019: Latency, area, power. In IEEE Symposium on Computer Arithmetic, 2019.

Deng et al., ImageNet: A large-scale hierarchical image database. In 2009 IEEE Conference on Computer Vision and Pattern Recognition, pp. 248-255, Jun. 2009 doi: 10.1109/CVPR.2009.5206848.

Fengfu Li and Bin Liu. Ternary weight networks. CoRR, abs/1605.04711, 2016.

Francois Chollet, Xception: Deep learning with depthwise separable convolutions. In The IEEE Conference on Computer Vision and Pattern Recognition (CVPR), Jul. 2017.

Gope et al., Ternary hybrid neural-tree networks for highly constrained iot applications. CoRR, abs/1903.01531, 2019.

Gordon et al., Morphnet: Fast & simple resource-constrained structure learning of deep networks. In 2018 IEEE Conference on Computer Vision and Pattern Recognition , CVPR 2018, Salt Lake City, UT, USA, Jun. 18-22, 2018, pp. 15 86- 15 95, 2018. do i: IO.I 109/CVPR.2018.00171.

Guo et al., Dynamic network surgery for efficient dnns. In Proceedings of the 30th International Conference on Neural Information Processing Systems, NI PS'16, pp. 1387-1395, USA, 2016. Curran Associates inc. ISBN 978-1-5108-3881-9.

Guo et al., Network sketching: Exploiting binary structure in deep cnns. In 2017 IEEE Conference on Computer Vision and Pattern Recognition, CVPR 2017, Honolulu, HI, USA, Jul. 21-26, 2017, pp. 4040-1048,2017. doi: 10.1109/CVPR. 2017.430.

Han et al., Deep compression: Compressing deep neural network with pruning, trained quantization and huffman coding. CoRR, abs/1510.00149, 2015.

He et al., AMC: automl for model compression and acceleration on mobile devices. Tn Computer Vision—ECCV 2018—15th European Conference, Munich, Germany, Sep. 8-14, 2018, Proceedings, Part VII, pp. 815-832, 2018. doi: I 0.1 007/978-3-030-01 234-2\-48.

He et al., Channel pruning for accelerating very deep neural networks. In IEEE International Conference on Computer Vision, /CCV 2077, Venice, Italy, Oct. 22-29, 2077 , pp. 1398-1406, 2017 do i: I0.1109/ICCV.2017.155.

He et al., Deep residual learning for image recognition. In 2076 IEEE Conference on Computer Vision and Pattern Recognition, CVPR 2076 , Las Vegas, NV, USA, Jun. 27-30, 2016 , pp. 770-778,2016. doi: 10.1109/CVPR.2016.90.

Howard et al., Mobilenets: Efficient convolutional neural networks for mobile vision applications. CoRR, abs/1704.04861, 2017.

Howard et al., Searching for mobilenetv3. CoRR, abs/1905.02244, 2019.

Jaderberg et al., Speeding up convolutional neural networks with low rank expansions. In British Machine Vision Conference, BMVC 2014, Nottingham, UK, Sep. 1-5, 2014, 2014.

Jouppi et al., In-datacenter performance analysis of a tensor processing unit. In Proceedings of the 44th Annual International Symposium on Computer Architecture, ISCA '17, pp. 1-12, New York, NY, USA, 2017. ACM. ISBN 978-1-4503-4892-8. doi: 10. I 145/3079856.3080246.

Krizhevsky et al., Imagenet classification with deep convolutional neural networks. In Advances in Neural Information Processing Systems 25: 26th Annual Conference on Neural Information Processing Systems 2012. Proceedings of a meeting held Dec. 3-6, 2012, Lake Tahoe, Nevada, United States, pp. 1106-1114, 2012.

Lin et al., Towards accurate binary convolutional neural network. In Advances in Neural Information Processing Systems 30: Annual Conference on Neural Information Processing Systems 2017,Dec. 4-9, 2017, Long Beach, CA, USA, pp. 344-352, 2017.

Liu et al., Learning low-precision neural networks without straight-through estimator (STE). In Proceedings of the Twenty-Eighth International Joint Conference on Artificial Intelligence, IJCAJ 2019, Macao, China, Aug. 10-16, 2019, pp. 3066-3072, 2019. doi: 10.24963/ijcai.2019/425.

Long et al., Fully convolutional networks for semantic segmentation. In IEEE Conference on Computer Vision and Pattern Recognition, CVPR 2015 , Boston, MA, USA, Jun. 7-12, 2015, pp. 3431-3440,2015. doi: 10.1109/CVPR.2015.7298965.

Louizos et al., Relaxed quantization for discretized neural networks. In 7th International Conference on Learning Representations, ICLR 2019, New Orleans, LA, USA, May 6-9, 2019, 2019.

Luo et al., Thinet: A filter level pruning method for deep neural network compression. IEEE International Conference on Computer Vision,ICCV 2017, Venice, Italy, Oct. 22-29, 2017, pp. 5068-5076, 2017. doi: 10.1109/ICCV.20 17.541.

M. Horowitz. Computing's energy problem (and what we can do about it). In 2014 IEEE International Solid-State Circuits Conference Digest of Technical Papers (ISSCC), pp. 10-14, Feb. 2014 doi: 10.1109/TSSCC.2014.6757323.

Narang et al., Exploring sparsity in recurrent neural networks. CoRR, abs/1704.05 I 1 9, 2017.

Rastegar et al., Xnor-net: Imagenet classification using binary convolutional neural networks. In Computer Vision—ECCV 2UI6—14th European Conference, Amsterdam, The Netherlands, Oct. 11-14, 2016, Proceedings, Part N , pp. 525-542, 2016. doi: 10.1007/978-3-319-46493-0\_3 2.

Redmon et al., You only look once: Unified, real-time object detection . In 2016 IEEE Conference on Computer Vision and Pattern Recognition, CVPR 2016, Las Vegas, NV, USA, Jun. 27-30, 2016, pp. 779-788, 2016. doi: 10. I 109/CVPR.2016.91.

Ren et al., Faster R-CNN: towards real-time object detection with region proposal networks. In Advances in Neural Information

(56) References Cited

OTHER PUBLICATIONS

Processing Systems 28: Annual Conference on Neural Information Processing Systems 2015, Dec. 7-12, 2015, Montreal, Quebec, Canada, pp. 91-99, 2015.

Sandler et al., MobileNetV2: Inverted residuals and linear bottlenecks: Mobile networks for classification, detection and segmentation. CoRR, abs/1801.04381, 2018.

Sun et al., Multi-precision quantized neural networks via encoding decomposition of {-1, +1}. In The Thirty-Third AAA! Conference on Artificial Intelligence, AAA! 2019, The Thirty-First Innovative Applications of Artificial Intelligence Conference, IAAI 2019, The Ninth AAA[ Symposium on Educational Advances in Artificial Intelligence, EAAI 2019, Honolulu, Hawaii, USA, Jan. 27-Feb. 1, 2019., pp. 5024-5032, 2019.

Szegedy et al., Going deeper with convolutions. In Computer Vision and Pattern Recognition (CVPR), 2015.

Tai et al., Convolutional neural networks with low-rank regularization. CoRR, abs/1511.06067, 2015.

Tschannen et al., StrassenNets: Deep learning with a multiplication budget. In Jennifer Dy and Andreas Krause (eds ), Proceedings of the 35th International Conference on Machine Learning, vol. 80 of Proceedings of Machine Learning Research, pp. 4985-4994, Stockholmsmssan, Stockholm Sweden, Jul. 10-15, 2018. PMLR.

Wang et al., HAQ: Hardware-aware automated quantization with mixed precision. In The IEEE Conference on Computer Vision and Pattern Recognition (CVPR), Jun. 2019.

Wen et al., Coordinating filters for faster deep neural networks. In IEEE International Conference on Computer Vision, !CCV 2017, Venice, Italy, Oct. 22-29, 2017, pp. 658-666, 2017. doi: 10.1109/ICCV.2017.78.

Wen et al., Learning structured sparsity in deep neural networks. In Proceedings of the 30th International Conference an Neural Information Processing Systems, NIPS'I6, pp. 2082-2090, USA, 2016. Curran Associates Inc. ISBN 978-I-5108-3881-9.

Yang et al., Quantization networks. In The IEEE Conference on Computer Vision and Pattern Recognition (CVPR), Jun. 2019.

Yang et al., Netadapt: Platform-aware neural network adaptation for mobile applications. Tn Computer Vision—ECCV 2018—15th European Conference, Munich, Germany, Sep. 8-14, 2018, Proceedings, Part X, pp. 289-304, 2018. doi: 10.1007/978-3-030-01249-6\_18.

Zhu et al., Binary ensemble neural network: More bits per network or more networks per bit? In The IEEE Conference an Computer Vision and Pattern Recognition (CVPR), Jun. 2019.

Zhu et al., Trained ternary quantization. CoRR, abs/1612.01064, 2016.

Zhu et al., To prune, or not to prune: exploring the efficacy of pruning for model compression. CoRR, abs/1710.01878, 2017.

Zhuang et al., Discrimination-aware channel pruning for deep neural networks. In Advances in Neural Information Processing Systems 31: Annual Conference on Neural Information Processing Systems 2018, NeurIPS 2018, Dec. 3-8, 2018, Montreal, Canada., pp. 883-894, 2018.

Zhuang et al., Structured binary neural networks for accurate image classification and semantic segmentation. IEEE Conference on Computer Vision and Pattern Recognition (CVPR), Jun. 2019.

Zhang et al., Cambricon-x: An accelerator for sparse neural networks. In The 49th Annual IEEE/ACM International Symposium on Microarchitecture, MICRO-49, pp. 20:1-20:12, Piscataway, NJ, USA, 2016.

Zhang et al., Lq-nets: Learned quantization for highly accurate and compact deep neural networks. In Computer Vision—ECCV 2018—15th European Conference, Munich, Germany, Sep. 8-14, 2018, Proceedings, Part VIII, pp. 373-390, 2018a. doi: 10.1007/978-3-030-01237-3 \_23.

Zhang et al., Shufflenet: An extremely efficient convolutional neural network for mobile devices. In The IEEE Conference on Computer Vision and Pattern Recognition (CVPR), Jun. 2018.

Zhou et al., Dorefa-net: Training low bitwidth convolutional neural networks with low bitwidth gradients. CoRR, abs/1606.06160, 2016.

Al-Hami et al., "Method for hybrid precision convolutional neural network representation," arXiv preprint arXiv: 1807.09760, 2018.

Mellempudi et al., "Mixed precision training with 8-bit floating point," arXiv preprint arXiv: 1905.12334, 2019.

* cited by examiner

| Network | Accuracy (%) | Muls | Adds | MACs | Model size | Energy/inference (normalized) | Throughput (normalized) |
|---|---|---|---|---|---|---|---|
| MobileNets (float6) | 65.2 | - | - | 149.49M | 2590.07KB | 1 | 1 |
| MobileNets (TWN (Li & Liu (2016))) | 55.54 | - | 149.49 | - | 323.75KB | 0.2 | 2 |
| ST-MobileNets ($r = 0.5c_{out}$) | 48.92 | 0.77M | 158.54M | 8.69M | 322.33KB | 0.27 | 1.69 |
| ST-MobileNets ($r = 0.75c_{out}$) | 56.95 | 1.16M | 236.16M | 8.69M | 631.76KB | 0.37 | 1.17 |
| ST-MobileNets ($r = c_{out}$) | 61.8 | 1.55M | 313.78M | 8.69M | 741.19KB | 0.48 | 0.9 |
| ST-MobileNets ($r = 2c_{out}$) | 65.14 | 3.11M | 624.27M | 8.69M | 1178.92KB | 0.9 | 0.46 |

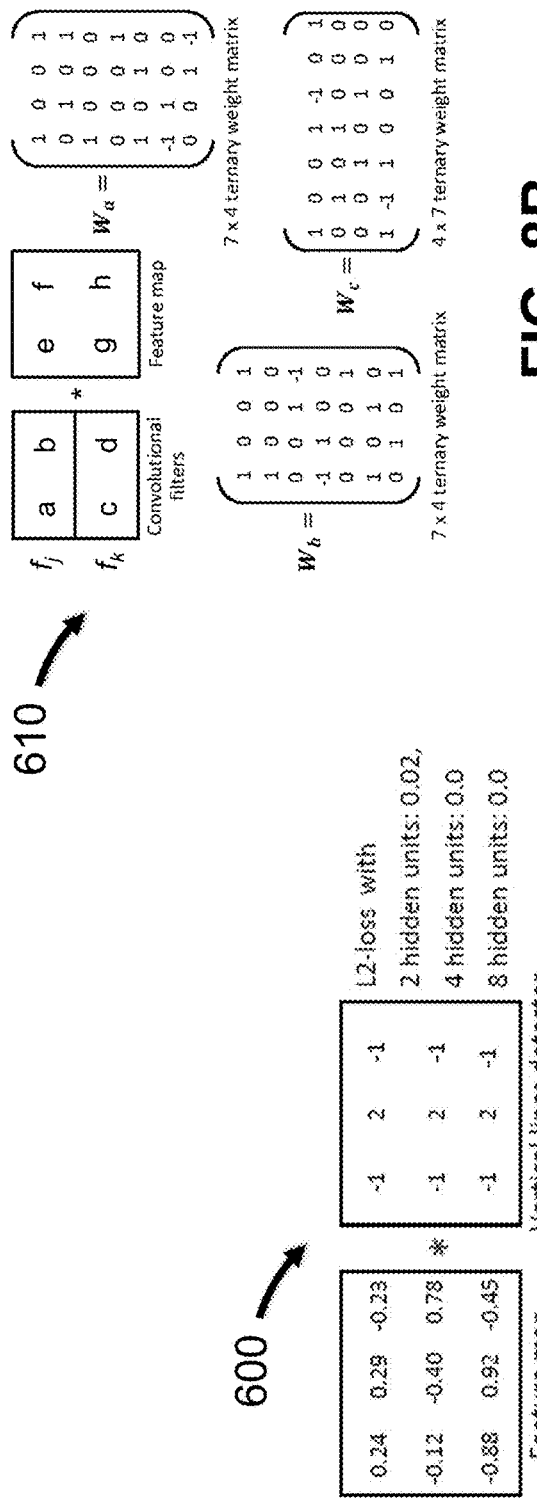
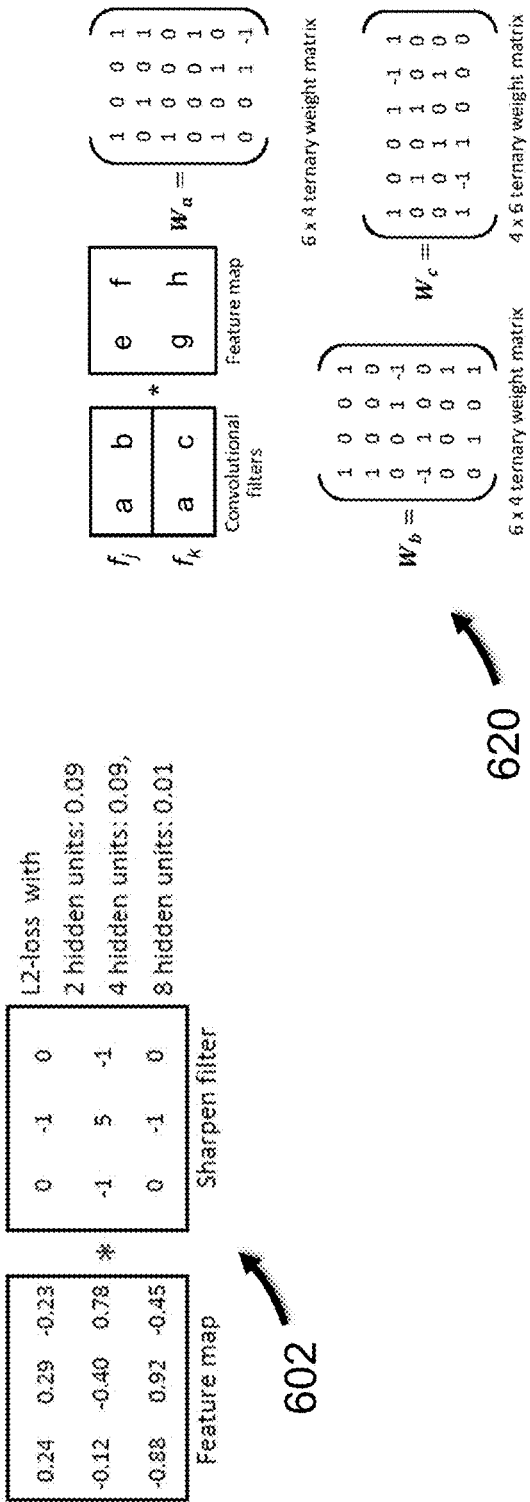
FIG. 8A
FIG. 8B
FIG. 8C

410

| Training phase | Hyperparameters |
|---|---|
| Train using full-precision strassen matrices | Batch size per GPU: 128<br>Number of GPUs used: 4<br>Optimizer: Nesterov accelerated gradient (NAG)<br>(Momentum: 0.9, Weight decay: 0.0001)<br>Number of epochs: 200<br>Weight initialization: Xavier<br>Initial, final learning rate: 0.2, 0.0<br>Learning rate schedule: cosine decay<br>Number of warmup epochs: 5<br>Starting warmup learning rate: 0.0<br>Size of the input image: 224 x 224 x 3 |
| Activate quantization for strassen matrices | Batch size per GPU: 128<br>Number of GPUs used: 4<br>Optimizer: Nesterov accelerated gradient (NAG)<br>(Momentum: 0.9, Weight decay: 0.0001)<br>Number of epochs: 75<br>Initial, final learning rate: 0.02, 0.0<br>Learning rate schedule: cosine decay |
| Freeze strassen matrices to ternary values | Batch size per GPU: 128<br>Number of GPUs used: 4<br>Optimizer: Nesterov accelerated gradient (NAG)<br>(Momentum: 0.9, Weight decay: 0.0001)<br>Number of epochs: 25<br>Initial, final learning rate: 0.002, 0.0<br>Learning rate schedule: cosine decay |

FIG. 10

| Method | #bits per weight/activation | Top-1 Acc. (%) | Top-5 Acc. (%) |
|---|---|---|---|
| Baseline MobileNets[6] | 32/32 | 65.53 | 86.48 |
| Baseline MobileNets[7] | 16/16 | 65.2 | 86.34 |
| ST-MobileNets ($r = 0.5c_{out}$) | 2/16 | 48.92 | 73.68 |
| ST-MobileNets ($r = 0.75c_{out}$) | 2/16 | 56.95 | 80.25 |
| ST-MobileNets ($r = c_{out}$) | 2/16 | 61.8 | 83.97 |
| ST-MobileNets ($r = 2c_{out}$) | 2/16 | 65.14 | 86.26 |
| Hybrid MobileNets ($\alpha = 0.25, r = 1.33c_{out}$) | 2,16/16 | 63.47 | 85.1 |
| Hybrid MobileNets ($\alpha = 0.25, r = 2c_{out}$) | 2,16/16 | 65.2 | 86.05 |
| Hybrid MobileNets ($\alpha = 0.375, r = c_{out}$) | 2,16/16 | 64.13 | 85.4 |
| Hybrid MobileNets ($\alpha = 0.375, r = 1.6c_{out}$) | 2,16/16 | 64.17 | 85.38 |
| Hybrid MobileNets ($\alpha = 0.375, r = 2c_{out}$) | 2,16/16 | 65.2 | 86.05 |
| Hybrid MobileNets ($\alpha = 0.5, r = c_{out}$) | 2,16/16 | 64.69 | 85.66 |
| Hybrid MobileNets ($\alpha = 0.5, r = 2c_{out}$) | 2,16/16 | 65.17 | 85.98 |
| Baseline MobileNets[8] | 32/32 | 63.3 | 84.9 |
| Baseline MobileNets[9] | 8/8 | 62.2 | - |
| Alpha-blending (Liu & Mattina (2019))[10] | 8/8 | 63 | - |
| Alpha-blending (Liu & Mattina (2019))[10] | 4/8 | 58.4 | - |
| HAQ (Wang et al. (2019))[10] | | | |
| RQ (Louizos et al. (2019))[11] | | | |

FIG. 11

MIXED-PRECISION COMPUTATION UNIT

CROSS-REFERENCE TO RELATED APPLICATIONS

This application claims priority to U.S. Provisional Patent Application Ser. No. 62/905,486, filed on Sep. 25, 2019, the content of which is hereby incorporated by reference in its entirety.

BACKGROUND

The present disclosure relates to computer systems. More particularly, the present disclosure relates to computer systems that include neural networks.

With the recent advancements in hardware platforms and increasing data deluge, artificial neural networks (ANNs), and, more particularly, deep neural networks (DNNs), such as convolutional neural networks (CNNs), have achieved remarkable success in various machine learning (ML) tasks such as image classification, object detection, semantic segmentation, etc. As a consequence, ANN applications have migrated to mobile platforms for the use of a wider audience. However, the large model size and corresponding computational inefficiency of ANNs often make it infeasible to run many real-time ML applications on resource-constrained mobile and embedded hardware, such as smartphones, augmented reality (AR)/virtual reality (VR) devices, etc.

BRIEF DESCRIPTION OF THE DRAWINGS

FIG. 6 presents a table that depicts test accuracy and other data, in accordance with embodiments of the present disclosure.

FIG. 8A depicts the variance in the sensitivity of two filters to quantization, in accordance with embodiments of the present disclosure.

FIG. 8B depicts the ease of ternary quantization for a filter bank with no common values, in accordance with embodiments of the present disclosure.

FIG. 8C depicts the ease of ternary quantization for a filter bank with common values, in accordance with embodiments of the present disclosure.

FIG. 10 depicts a table of hyperparameters for training hybrid MobileNets, in accordance with embodiments of the present invention.

FIG. 11 depicts a table of Top-1 and top-5 accuracy (%) of MobileNets (full resolution and multiplier of 0.5) on Imagenet for different number of bits per weight and activation, in accordance with embodiments of the present invention.

DETAILED DESCRIPTION

Figure 1:
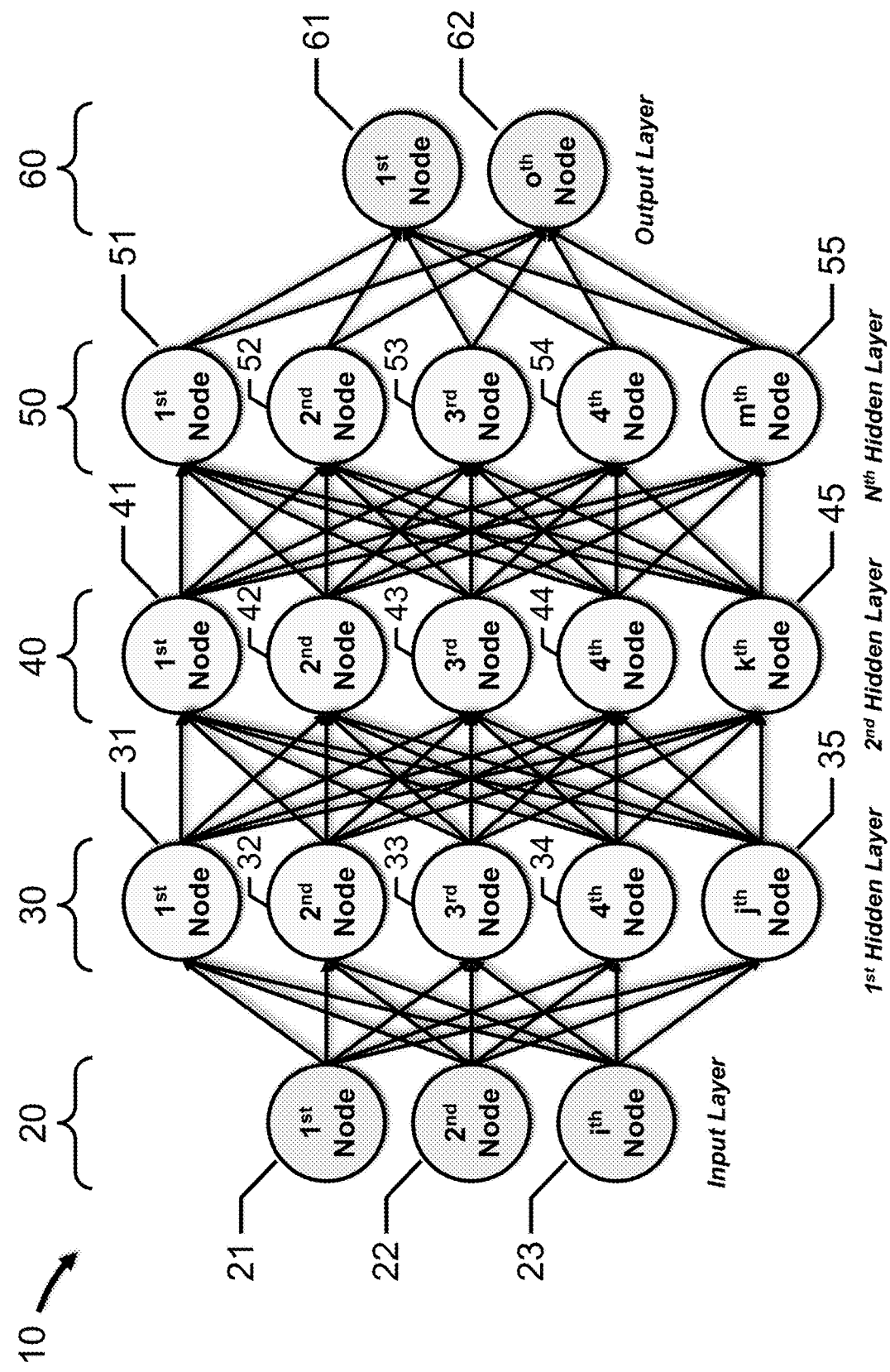
FIG. 1 depicts an ANN, in accordance with an embodiment of the present disclosure.

Embodiments of the present disclosure will now be described with reference to the drawing figures, in which like reference numerals refer to like parts throughout.

Embodiments of the present disclosure advantageously provide a mixed-precision computation (MPC) unit for layer-wise hybrid filter banks for ANNs that provide start-of-the-art accuracy levels while requiring a fraction of the model size and considerably fewer MAC and multiplication operations per inference. The end-to-end learning of hybrid filter banks makes this possible by keeping precision critical convolutional filters in high-precision values and "strasseni-fying" quantization tolerant filters only to ternary values. The filters that are most sensitive to quantization errors perform traditional convolutions with input feature maps, whereas ternary quantization tolerant filters can perform strassenified convolutions using narrow hidden layers.

In one embodiment, a mixed precision computation (MPC) unit for executing one or more mixed-precision layers of an artificial neural network (ANN) includes a multiplier circuit configured to input a pair of operands and output a product, a first adder circuit coupled to the multiplier circuit, a second adder circuit, coupled to the first adder circuit, configured to input a pair of operands, an accumulator circuit, coupled to the multiplier circuit and the first adder circuit, configured to output an accumulated value, and a controller, coupled to the multiplier circuit, the first adder circuit, the second adder circuit and the accumulator circuit, configured to input a mode control signal. The controller has a plurality of operating modes including a high precision mode, a low precision add mode and a low precision multiply mode.

An ANN models the relationships between input data or signals and output data or signals using a network of interconnected nodes that is trained through a learning process. The nodes are arranged into various layers, including, for example, an input layer, one or more hidden layers, and an output layer. The input layer receives input data, such as, for example, image data, and the output layer generates output data, such as, for example, a probability that the image data contains a known object. Each hidden layer provides at least a partial transformation of the input data to the output data. A DNN has multiple hidden layers in order to model complex, nonlinear relationships between input data and output data.

In a fully-connected, feedforward ANN, each node is connected to all of the nodes in the preceding layer, as well as to all of the nodes in the subsequent layer. For example, each input layer node is connected to each hidden layer node, each hidden layer node is connected to each input layer node and each output layer node, and each output layer node is connected to each hidden layer node. Additional hidden layers are similarly interconnected. Each connection has a weight value, and each node has an activation function, such as, for example, a linear function, a step function, a sigmoid function, a tan h function, a rectified linear unit (ReLU) function, etc., that determines the output of the node based on the weighted sum of the inputs to the node. The input data propagates from the input layer nodes, through respective connection weights to the hidden layer nodes, and then through respective connection weights to the output layer nodes.

More particularly, at each input node, input data is provided to the activation function for that node, and the output of the activation function is then provided as an input data value to each hidden layer node. At each hidden layer node, the input data value received from each input layer node is multiplied by a respective connection weight, and the resulting products are summed or accumulated into an activation value that is provided to the activation function for that node. The output of the activation function is then provided as an input data value to each output layer node. At each output layer node, the output data value received from each hidden layer node is multiplied by a respective connection weight, and the resulting products are summed or accumulated into an activation value that is provided to the activation function for that node. The output of the activation function is then provided as output data. Additional hidden layers may be similarly configured to process data.

FIG. 1 depicts an ANN, in accordance with an embodiment of the present disclosure.

ANN 10 includes input layer 20, one or more hidden layers 30, 40, 50, etc., and output layer 60. Input layer 20 includes one or more input nodes 21, 22, 23, etc. Hidden layer 30 includes one or more hidden nodes 31, 32, 33, 34, 35, etc. Hidden layer 40 includes one or more hidden nodes 41, 42, 43, 44, 45, etc. Hidden layer 50 includes one or more hidden nodes 51, 52, 53, 54, 55, etc. Output layer 60 includes one or more output nodes 61, 62, etc. Generally, ANN 10 includes N hidden layers, input layer 20 includes "i" nodes, hidden layer 30 includes "j" nodes, hidden layer 40 includes "k" nodes, hidden layer 50 includes "m" nodes, and output layer 60 includes "o" nodes.

In one embodiment, N equals 3, i equals 3, j, k and m equal 5 and o equals 2 (depicted in FIG. 1). Input node 21 is coupled to hidden nodes 31 to 35, input node 22 is coupled to hidden nodes 31 to 35, and input node 23 is coupled to hidden nodes 31 to 35. Hidden node 31 is coupled to hidden nodes 41 to 45, hidden node 32 is coupled to hidden nodes 41 to 45, hidden node 33 is coupled to hidden nodes 41 to 45, hidden node 34 is coupled to hidden nodes 41 to 45, and hidden node 35 is coupled to hidden nodes 41 to 45. Hidden node 41 is coupled to hidden nodes 51 to 55, hidden node 42 is coupled to hidden nodes 51 to 55, hidden node 43 is coupled to hidden nodes 51 to 55, hidden node 44 is coupled to hidden nodes 51 to 55, and hidden node 45 is coupled to hidden nodes 51 to 55. Hidden node 51 is coupled to output nodes 61 and 62, hidden node 52 is coupled to output nodes 61 and 62, hidden node 53 is coupled to output nodes 61 and 62, hidden node 54 is coupled to output nodes 61 and 62, and hidden node 55 is coupled to output nodes 61 and 62.

Many other variations of input, hidden and output layers are clearly possible, including hidden layers that are locally-connected, rather than fully-connected, to one another.

Training an ANN includes optimizing the connection weights between nodes by minimizing the prediction error of the output data until the ANN achieves a particular level of accuracy. One method is backpropagation, or backward propagation of errors, which iteratively and recursively determines a gradient descent with respect to the connection weights, and then adjusts the connection weights to improve the performance of the network.

A multi-layer perceptron (ML) is a fully-connected ANN that has an input layer, an output layer and one or more hidden layers. MPs may be used for natural language processing applications, such as machine translation, speech recognition, etc. Other ANNs include CNNs, RNNs, long short-term memories (LSTMs), shallow neural networks, etc.

A CNN is a variation of an MLP that may be used for classification or recognition applications, such as image recognition, speech recognition, etc. A CNN has an input layer, an output layer and multiple hidden layers including convolutional layers, pooling layers, normalization layers, fully-connected layers, etc. Each convolutional layer applies a sliding dot product or cross-correlation to an input volume, applies an activation function to the results, and then provides the activation or output volume to the next layer. Convolutional layers typically use the ReLU function as the activation function. In certain embodiments, the activation function is provided in a separate activation layer, such as, for example, a ReLU layer. A pooling layer reduces the dimensions of the output volume received from the preceding convolutional layer, and may calculate an average or a maximum over small clusters of data, such as, for example, 2×2 matrices. In certain embodiments, a convolutional layer and a pooling layer may form a single layer of a CNN. The fully-connected layers follow the convolutional and pooling layers, and include a flatten layer and a classification layer, followed by a normalization layer that includes a normalization function, such as the SoftMax function. The output layer follows the last fully-connected layer; in certain embodiments, the output layer may include the normalization function.

Figure 2:
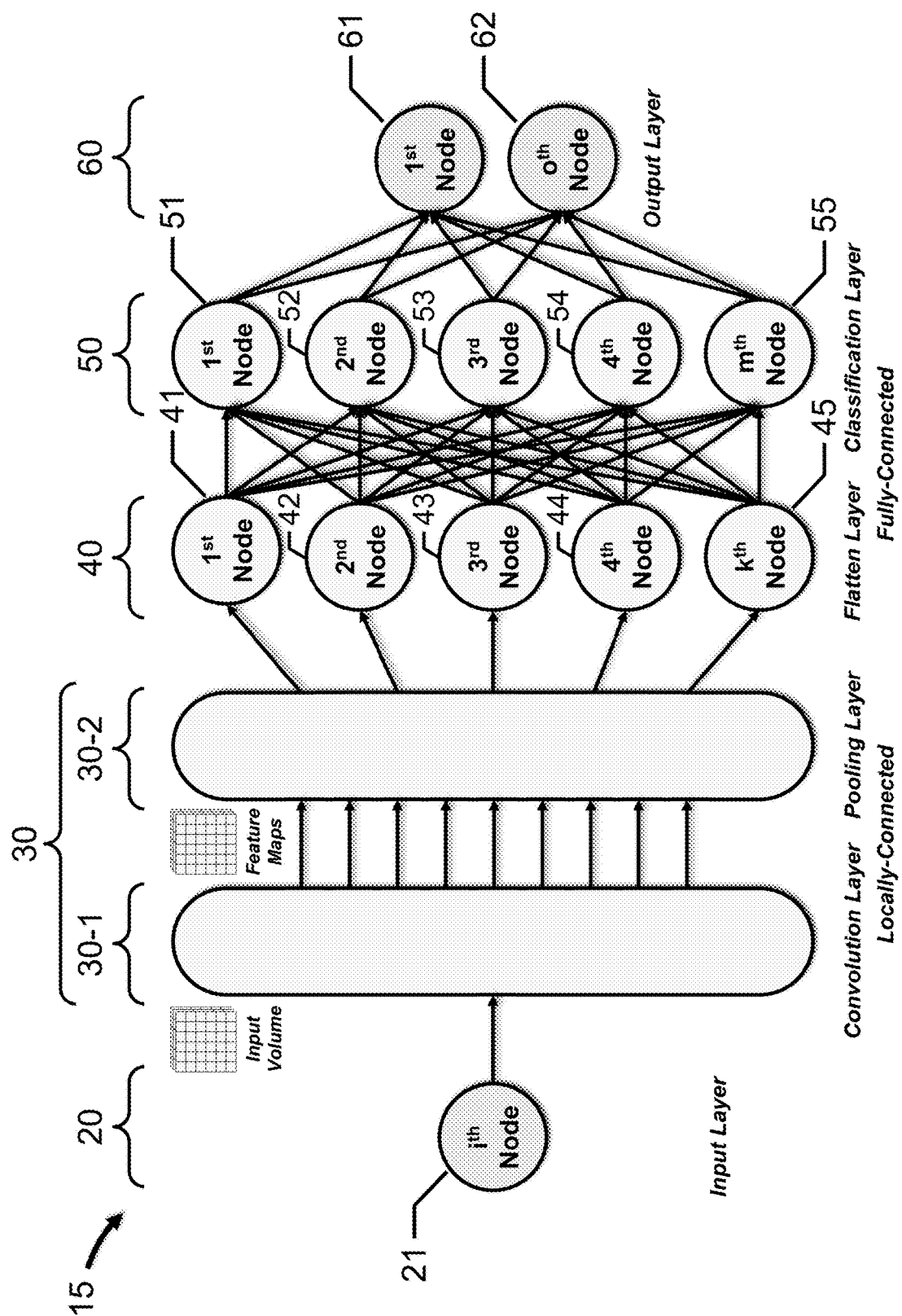
FIG. 2 depicts a CNN, in accordance with an embodiment of the present disclosure.

FIG. 2 depicts a CNN, in accordance with an embodiment of the present disclosure. CNN 15 includes input layer 20, one or more hidden layers, such as convolutional layer 30-1, pooling layer 30-2, hidden (flatten) layer 40, hidden (classification) layer 50, etc., and output layer 60. Many other variations of input, hidden and output layers are contemplated.

Input layer 20 includes one or more input nodes 21, etc., that present the input data, such as a color image, as an input volume to the first convolutional layer, e.g., convolutional layer 30-1. The input volume is a three-dimensional matrix that has a width, a height and a depth. For example, input data that represent a color image are presented as an input volume that is 512 pixels×512 pixels×3 channels (red, green, blue); other input volume dimensions may also be used, such as 32×32×3, 64×64×3, 128×128×3, etc., 32×32×1, 64×64×1, 128×128×1, 512×512×1, etc.

Convolutional layer 30-1 is locally-connected to input layer 20, and includes a plurality of nodes that are connected to local regions in the input volume (not depicted for clarity). For a CNN that uses a standard convolution, each node computes a dot product between the node's weights and the respective local region of the input volume. An activation function is then applied to the results of each convolution calculation to produce an output volume that is provided as an input volume to the subsequent layer. The activation function may be applied by each convolutional layer node or by the nodes of a subsequent locally-connected ReLU layer.

Pooling layer 30-2 is locally-connected to convolutional layer 30-1, and includes a plurality of nodes that are connected to local regions in the input volume (not depicted for clarity). Pooling layer 30-2 also produces an output volume that is provided as the input volume to the subsequent layer, such as, for example, another convolutional layer 30-1, a flatten layer 40, etc. In certain embodiments, convolutional layer 30-1 and pooling layer 30-2 form a single hidden layer 30. Similarly, in certain embodiments, convolutional layer 30-1, a ReLU layer and pooling layer 30-2 form a single hidden layer 30. Generally, the output volumes of the convolutional and pooling layers may be described as feature maps, and one or more single hidden layers 30 form a feature learning portion of CNN 15.

Hidden layer 40 is a "flatten" layer that is locally-connected to pooling layer 30-2, and includes one or more hidden (flatten) nodes 41, 42, 43, 44, 45, etc. Hidden (flatten) layer 40 "flattens" the output volume produced by the preceding pooling layer 30-2 into a column vector, which is provided to the subsequent, fully-connected hidden layer 50.

Hidden layer 50 is a classification layer that is fully-connected to hidden (flatten) layer 40, and includes one or more hidden (classification) nodes 51, 52, 53, 54, 55, etc.

Output layer 60 includes one or more output nodes 61, 62, etc., and is fully-connected to hidden (classification) layer 50. Fully-connected output layer 60 receives the classification results output by hidden (classification) layer 50, and each node outputs a predicted class score. A normalization function, such as a Softmax function, may be applied to the predicted class scores by output layer 60, or, alternatively, by an additional layer interposed between hidden (classification) layer 50 and output layer 60.

Similar to ANNs, training a CNN includes optimizing the connection weights between nodes by minimizing the prediction error of the output data until the CNN achieves a particular level of accuracy. As noted above, backpropagation may be used to iteratively and recursively determines a gradient descent with respect to the connection weights, and then adjusts the connection weights to improve the performance of the network. Matrix multiplication operations, and, more particularly, multiply-and-accumulate (MAC) operations, are used extensively by CNNs, as well as other ANNs.

Figure 3:
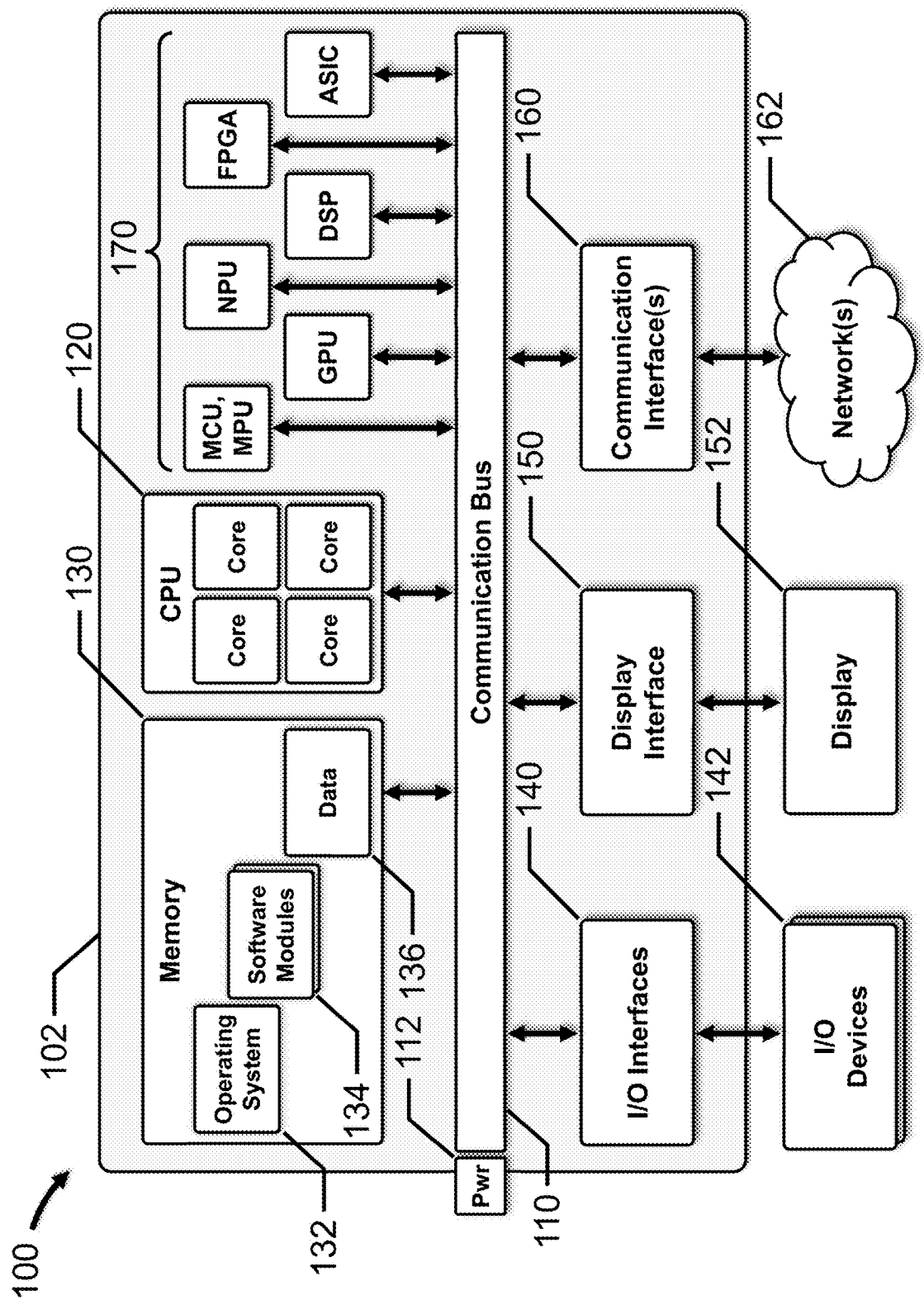
FIG. 3 depicts a block diagram of a system, in accordance with embodiments of the present disclosure.

FIG. 3 depicts a block diagram of system for executing an ANN, in accordance with embodiments of the present disclosure.

System 100 includes communication bus 110 coupled to one or more processors 120, memory 130, I/O interfaces 140, display interface 150, one or more communication interfaces 160, and one or more HAs 170. Generally, I/O interfaces 140 are coupled to I/O devices 142 using a wired or wireless connection, display interface 150 is coupled to display 152, and communication interface 160 is connected to network 162 using a wired or wireless connection. In many embodiments, certain components of system 100 are implemented as a system-on-chip (SoC) 102; in other embodiments, system 100 may be hosted on a traditional printed circuit board, motherboard, etc.

Communication bus 110 is a communication system that transfers data between processor 120, memory 130, I/O interfaces 140, display interface 150, communication interface 160, HAs 170, as well as other components not depicted in FIG. 3. Power connector 112 is coupled to communication bus 110 and a power supply (not shown). In certain embodiments, communication bus 110 is a network-on-chip (NoC).

Processor 120 includes one or more general-purpose or application-specific microprocessors that executes instructions to perform control, computation, input/output, etc. functions for system 100. Processor 120 may include a single integrated circuit, such as a micro-processing device, or multiple integrated circuit devices and/or circuit boards working in cooperation to accomplish the functions of processor 120. Additionally, processor 120 may include multiple processing cores, as depicted in FIG. 3. Generally, system 100 may include one or more processors 120, each containing one or more processing cores.

For example, system 100 may include 2 processors 120, each containing multiple processing cores. In certain embodiments, the processors form a heterogeneous processing architecture, such as, for example, Arm's "big.LITTLE" architecture, that couples relatively battery-saving and slower processor cores ("LITTLE" cores) with relatively more powerful and power-hungry processing cores ("big" cores). For example, one processor 120 may be a high performance processor containing 4 "big" processing cores, e.g., Arm Cortex-A73, Cortex-A75, Cortex-A76, etc., while the other processor 120 may be a high efficiency processor containing 4 "little" processing cores, e.g., Arm Cortex-53, Arm Cortex-55, etc.

In many embodiments, processor 120 may also be configured to execute classification-based ML models, such as, for example, ANNs, DNNs, CNNs, RNNs, SVM, Naïve Bayes etc. In these embodiments, processor 120 may provide the same functionality as a hardware accelerator, such as HA 170.

In addition, processor 120 may execute computer programs or modules, such as operating system 132, software modules 134, etc., stored within memory 130. For example, software modules 134 may include an ML application, an ANN application, a DNN application, a CNN application, an RNN application, etc.

Generally, storage element or memory 130 stores instructions for execution by processor 120 and data. Memory 130 may include a variety of non-transitory computer-readable medium that may be accessed by processor 120. In various embodiments, memory 130 may include volatile and non-volatile medium, non-removable medium and/or removable medium. For example, memory 130 may include any combination of random access memory (RAM), dynamic RAM (DRAM), static RAM (SRAM), read only memory (ROM), flash memory, cache memory, and/or any other type of non-transitory computer-readable medium.

Memory 130 contains various components for retrieving, presenting, modifying, and storing data. For example, memory 130 stores software modules that provide functionality when executed by processor 120. The software modules include operating system 132 that provides operating system functionality for system 100. Software modules 134 provide various functionality, such as image classification using CNNs, etc. Data 136 may include data associated with operating system 132, software modules 134, etc.

I/O interfaces 140 are configured to transmit and/or receive data from I/O devices 142. I/O interfaces 140 enable connectivity between processor 120 and I/O devices 142 by encoding data to be sent from processor 120 to I/O devices 142, and decoding data received from I/O devices 142 for processor 120. Generally, data may be sent over wired and/or wireless connections. For example, I/O interfaces 140 may include one or more wired communications interfaces, such as USB, Ethernet, etc., and/or one or more wireless communications interfaces, coupled to one or more antennas, such as WiFi, Bluetooth, cellular, etc.

Generally, I/O devices 142 provide input to system 100 and/or output from system 100. As discussed above, I/O devices 142 are operably connected to system 100 using a wired and/or wireless connection. I/O devices 142 may include a local processor coupled to a communication interface that is configured to communicate with system 100 using the wired and/or wireless connection. For example, I/O devices 142 may include a keyboard, mouse, touch pad, joystick, etc.

Display interface 150 is configured to transmit image data from system 100 to monitor or display 152.

Communication interface 160 is configured to transmit data to and from network 162 using one or more wired and/or wireless connections. Network 162 may include one or more local area networks, wide area networks, the Internet, etc., which may execute various network protocols, such as, for example, wired and/or wireless Ethernet, Bluetooth, etc. Network 162 may also include various combinations of wired and/or wireless physical layers, such as, for example, copper wire or coaxial cable networks, fiber optic networks, Bluetooth wireless networks, WiFi wireless networks, CDMA, FDMA and TDMA cellular wireless networks, etc.

HAs 170 are configured to execute ML models, such as, for example, ANN models, CNN models, RNN models, etc., in support of various ML applications embodied by software modules 134. Generally, processor 120 executes an ML application module 134 that includes, or relies upon, an ANN model with ANN weights. The ANN model and weights may be stored in memory 130 and then transferred, in whole or in part, to HA 170. Alternatively, the ANN model and weights may be stored in non-volatile memory on HA 170, or directly implemented in hardware using PEs, CEs, matrix multiplier units, MAC arrays, etc.

Generally, HA 170 includes one or more processors, coprocessors, processing engines (PEs), compute engines (CEs), etc., such as, for example, microcontroller units (MCUs), microprocessing units (MPUs), central processing units (CPUs), graphics processing units (GPUs), neural processing units (NPUs), such as, for example, the ARM ML Processor, digital signal processors (DSPs), field programmable gate arrays (FPGAs), application specific integrated circuits (ASICs), matrix multiplier circuits, MAC arrays, etc. HA 170 also includes non-volatile and/or volatile memories, such as, for example, ROM, flash memory, SRAM, DRAM, etc., as well as a communications bus interface.

Input data for the ANN model are transferred from memory 130 to HA 170 over communication bus 110, while output data from the ANN model are transferred from HA 170 to memory 130 over communication bus 110. The input data may include one or more input feature maps, while the output data may include one or more output feature maps, final results, etc.

In many embodiments, HA 170 receives the entire ANN model and weights from memory 130 over communication bus 110 for storage in local volatile memory (e.g., local SRAM, DRAM, etc.). In other embodiments, HA 170 receives portions of the ANN model and weights from memory 130 over communication bus 110. Each portion may correspond to at least one layer of the ANN model, such as, for example, input layer 20, hidden layers 30, 40, 50, output layer 60, etc. Alternatively, each portion may correspond to a portion of a single layer of the ANN model, such as, for example, a portion of input layer 20, a portion of hidden layer 30, etc.

In many embodiments, processor 120 determines the instructions needed to execute the entire ANN model, and then provides these instructions to HA 170 as the "ANN model." In other embodiments, processor 120 divides the ANN model into ANN model portions, and then determines the instructions needed to execute each ANN model portion. The instructions are then provided to HA 170 as the "ANN model portion." In certain embodiments, HA 170 determines the instructions needed to execute the ANN model or ANN model portion.

In many embodiments, the output feature maps produced by one layer of the ANN model are available as input feature maps to the succeeding layer of the ANN model. These intermediate feature maps may be stored on HA 170 in volatile memory, or, alternatively, transferred from HA 170 to memory 130 over communication bus 110 for later transfer to HA 170 as input feature maps. In other embodiments, a portion of an output feature map may be produced by a portion of a layer of an ANN model. Each output feature map portion may be stored, locally or in memory 130, until all of the layer portions have completed their respective calculations. The final output feature map may then be created by HA 170 or processor 120.

In certain embodiments, processor 120 may execute one or more layers of the ANN model, and provide the remaining layers to HA 170. For example, processor 120 may execute all of the fully-connected layers of a CNN model, while transferring all of the hidden convolutional layers, or layer, portions to HA 170.

For example, the ARM ML Processor supports a variety of ANNs, including CNNs and RNNs, for classification, object detection, image enhancements, speech recognition and natural language understanding. The ARM ML Processor includes a control unit, a direct memory access (DMA) engine, local memory and 16 CEs. Each CE includes, inter alia, a MAC engine that performs convolution operations, a programmable layer engine (PLE), local SRAM, a weight decoder, a control unit, a direct memory access (DMA) engine, etc. Each MAC engine performs up to eight 16-wide dot products with accumulation. Generally, the PLE performs non-convolution operations, such as, for example, pooling operations, ReLU activations, etc. Each CE receives input feature maps (IFMs) and weights sets over the NoC and stores them in local SRAM. The MAC engine and PLE process the IFMs to generate the output feature maps (OFMs), which are also stored in local SRAM prior to transmission over the NoC.

As noted above, the large model size and corresponding computational inefficiency of ANNs, CNNs, etc., often make it infeasible to run many real-time machine learning applications on resource-constrained mobile and embedded hardware, such as smartphones, AR/VR devices etc. To enable this computation and size compression of CNN models, one particularly effective approach has been the use of resource-efficient MobileNets CNN architecture, or "MobileNets."

MobileNets incorporates depthwise-separable (DS) convolution as an efficient alternative to the standard convolution.

Generally, a convolutional layer of a CNN model receives an input feature map with M input channels (e.g., $D_F \times D_F \times M$) and produces a square output feature map with N output channels (e.g., $D_G \times D_G \times M$), where $D_F$ is the spatial width and height of the input feature map, and $D_G$ is the spatial width and height of the output feature map. The convolution kernel (or filter) size is $D_k \times D_k \times M \times N$, where $D_K$ is the spatial dimension of the kernel. Generally, the kernel may be described as a filter set that includes N, three-dimensional filters, each having the dimensions $Dk \times Dk \times M$. Each one of the three-dimensional filters produces an output feature map for one channel of the N output channels. The standard convolution has a computational cost that depends on these dimensions, i.e., $D_k \times D_k \times M \times N \times D_F \times D_F$.

Figure 4A:
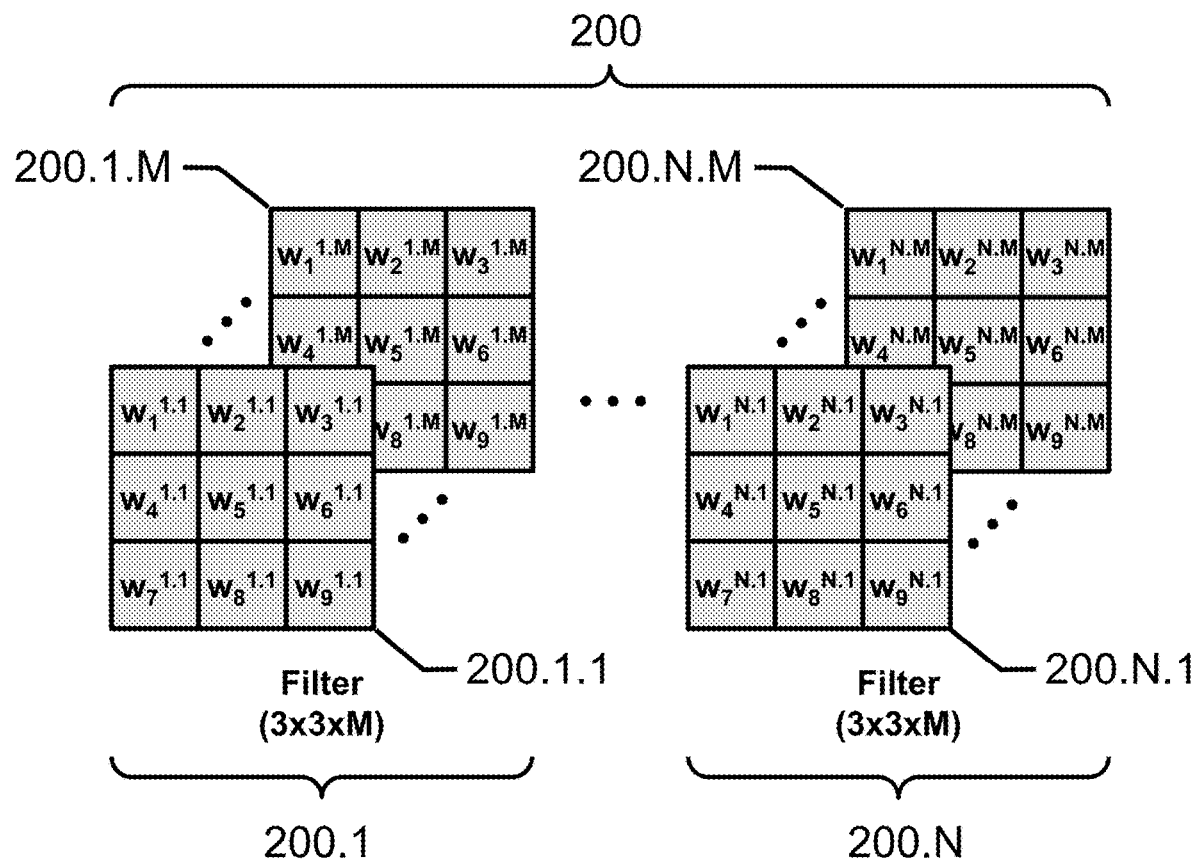
FIG. 4A depicts a filter for a standard convolutional layer, in accordance with an embodiment of the current disclosure.

FIG. 4A depicts filter 200 for a standard convolutional layer, in accordance with an embodiment of the current disclosure.

Filter 200 includes a three-dimensional filter for each of the N output channels, i.e., filters 200.1, . . . , 200.N. Filter 200.1 includes a two-dimensional filter for each of the M input channels, i.e., filters 200.1.1, . . . , 200.1.M. Filter 200.1.1 is a 3×3 filter that includes weights $w_1^{1.1}$, $w_2^{1.1}$, $w_3^{1.1}$, $w_4^{1.1}$, $w_5^{1.1}$, $w_6^{1.1}$, $w_7^{1.1}$, $w_8^{1.1}$, $w_9^{1.1}$, filter 200.1.M is a 3×3 filter that includes weights $w_1^{1.M}$, $w_2^{1.M}$, $w_3^{1.M}$, $w_4^{1.M}$, $w_5^{1.M}$, $w_6^{1.M}$, $w_7^{1.M}$, $w_8^{1.M}$, $w_9^{1.M}$, etc. Similarly, filter 200.N.1 is a 3×3 filter that includes weights $w_1^{N.1}$, $w_2^{N.1}$, $w_3^{N.1}$, $w_4^{N.1}$, $w_5^{N.1}$, $w_6^{N.1}$, $w_7^{N.1}$, $w_8^{N.1}$, $w_9^{N.1}$ filter 200.N.M is a 3×3 filter that includes weights $w_1^{N.M}$, $w_2^{N.M}$, $w_3^{N.M}$, $w_4^{N.M}$, $w_6^{N.M}$, $w_6^{N.M}$, $w_7^{N.M}$, $w_8^{N.M}$, $w_9^{N.M}$, etc.

As discussed above, a standard convolution filters and combines an input feature map into an output feature map in a single computation. A DS convolution divides the filtering and combining into two separate computations, i.e., a depthwise convolution that filters the input feature map, and a pointwise convolution that combines the output of each filter into an output feature map. This factorization drastically reduces computation and model size. More particularly, a DS convolution breaks the interaction between the number of output channels (N) and the size of the filter ($D_k \times D_k \times M$) by factorizing a standard convolution ($D_k \times D_k \times M$) into M depthwise convolutions ($D_k \times D_k$) and N pointwise convolutions (1×1×M). The depthwise convolutions apply a filter ($D_k \times D_k$) to each of the M input channels, and the N pointwise convolutions combines the outputs of the depthwise convolutions into an output feature map with N channels. The DS convolution has a computational cost that reflects on this computational bifurcation, i.e., $D_k \times D_k \times M \times D_F \times D_F + N \times N \times D_F \times D_F = 1/N + 1/D_k^2$.

Figure 4B:
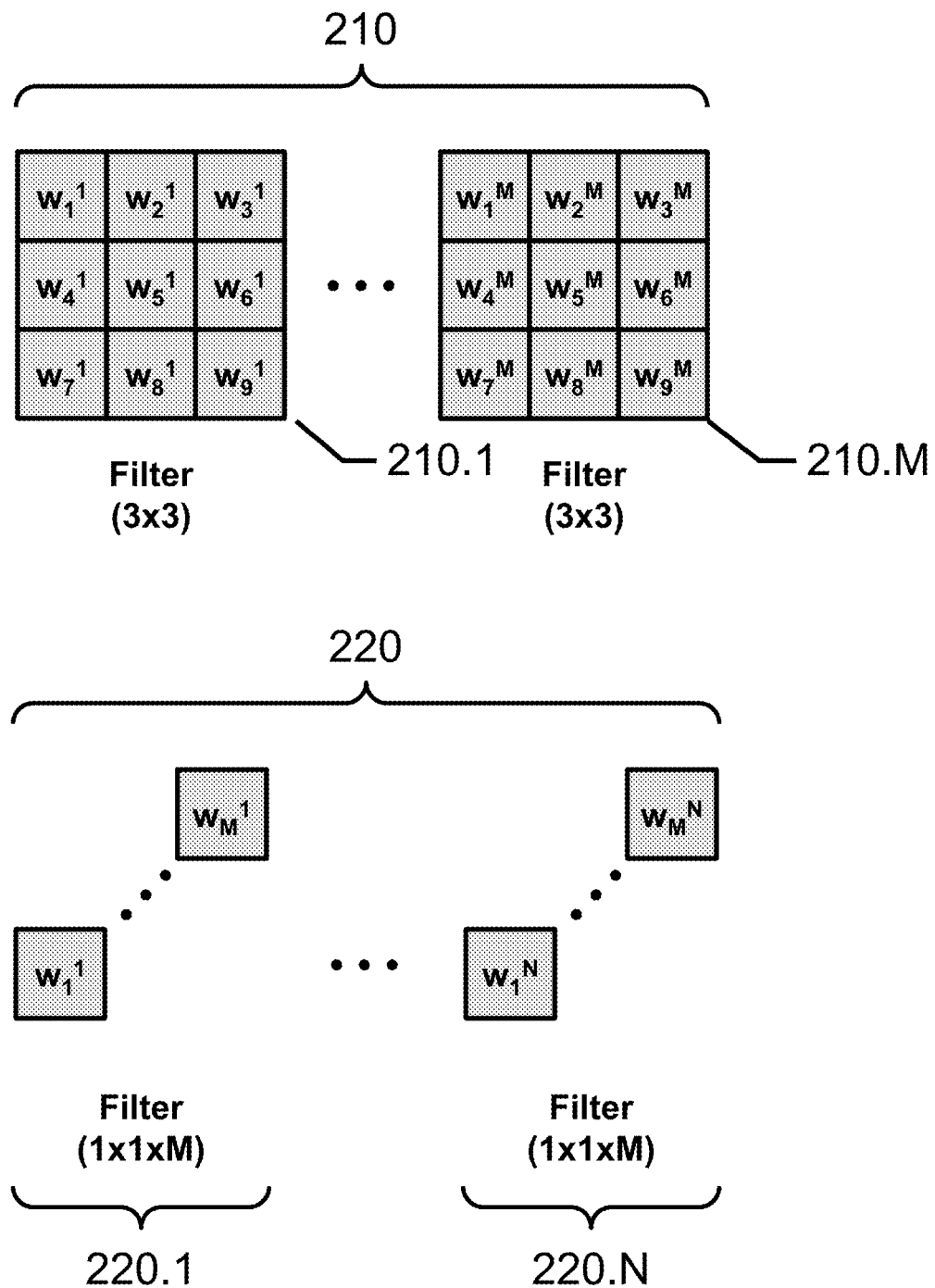
FIG. 4B depicts a filter for a depthwise convolutional layer and a filter for a pointwise convolutional layer, in accordance with an embodiment of the current disclosure.

FIG. 4B depicts filter 210 for a depthwise convolutional layer and filter 220 for a pointwise convolutional layer, in accordance with an embodiment of the current disclosure.

Filter 210 includes a two-dimensional filter for each of the M input channels, i.e., filters 210.1, . . . , 210.M. Filter 210.1 is a 3×3 filter that includes weights $w_1^1$, $w_2^1$, $w_3^1$, $w_4^1$, $w_5^1$, $w_6^1$, $w_7^1$, $w_8^1$, $w_9^1$, while filter 210.M is a 3×3 filter that includes weights $w_1^M$, $w_2^M$, $w_3^M$, $w_4^M$, $w_5^M$, $w_6^M$, $w_7^M$, $w_8^M$, $w_9^M$. Filter 220 includes N, three dimensional filters, i.e., filters 220.1, . . . , 220.N. Filter 220.1 is a 1×1×M filter that includes weights $w_1^1$, . . . , $w_M^1$, while filter 220.N is a 1×1×M filter that includes weights $w_1^N$, . . . , $w_M^N$.

Figure 5:
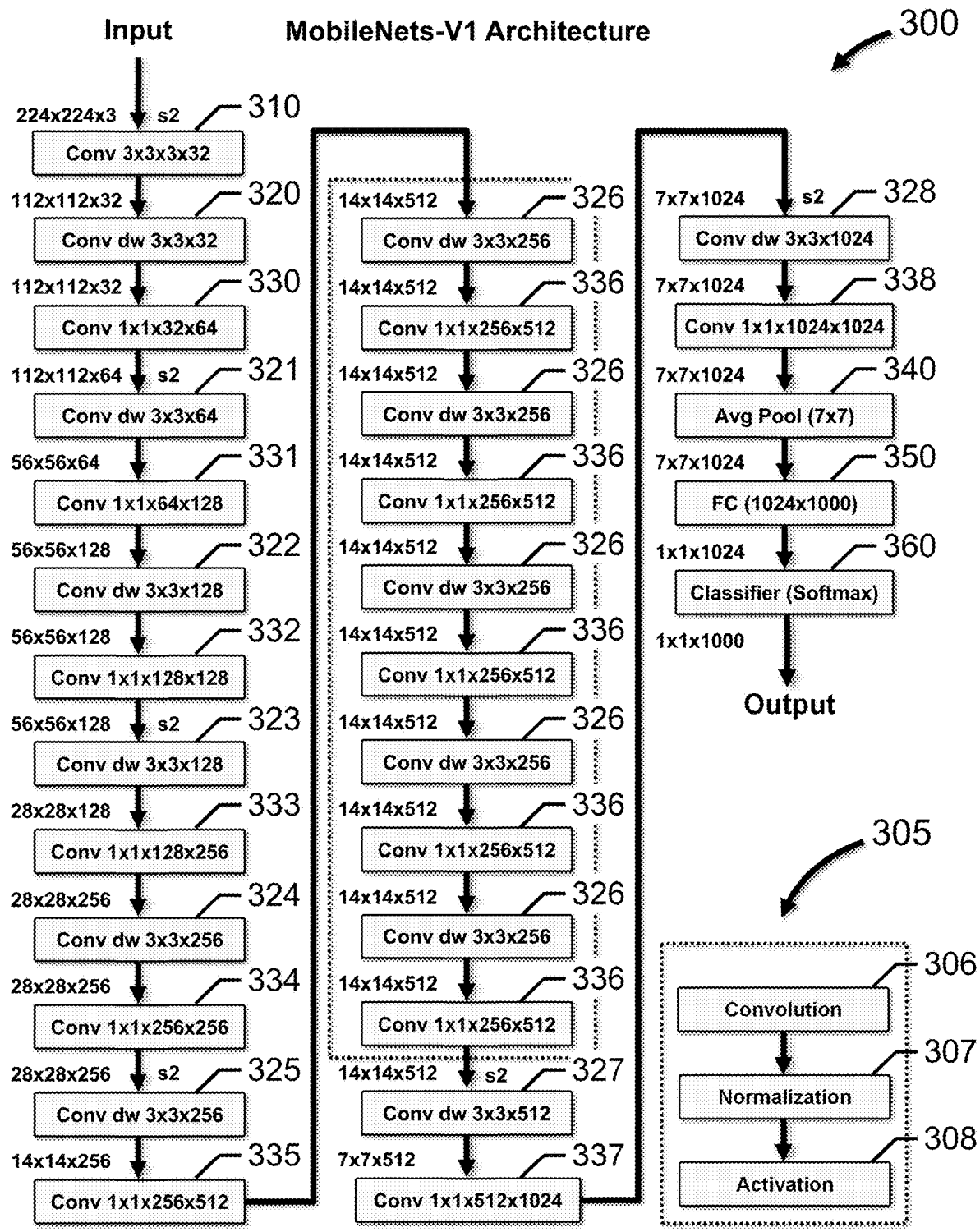
FIG. 5 depicts a block diagram of a CNN, in accordance with an embodiment of the present disclosure.

FIG. 5 depicts a block diagram of CNN 300, in accordance with an embodiment of the present disclosure.

CNN 300 is a representation of the MobileNets V1 CNN architecture, which includes convolutional layers, a pooling layer, a fully-connected layer and a classification (Softmax) layer. Each convolutional layer includes a full, depthwise or pointwise convolution followed by a normalization function (e.g., a batch normalization) and an activation function (e.g., ReLU function). Certain convolutional layers down sample the input feature maps by using a strided convolution (i.e., s=2). FIG. 5 also depicts a generic convolutional layer 305, which includes convolution function 306, normalization function 307 and activation function 308. The pooling layer includes an average pooling function followed by a normalization function (i.e., a batch normalization) and an activation function (i.e., ReLU function), while the fully-connected layer feeds directly into the classification layer.

Convolution layer 310 has an input size of 224×224×3, a full convolution with a stride of 2 and a filter shape of 3×3×3×32, batch normalization, ReLU activation, and an output size of 112×112×32.

Convolution layer 320 has an input size of 112×112×32, a depthwise convolution with a stride of 1 and a filter shape of 3×3×32, batch normalization, ReLU activation, and an output size of 112×112×32. Convolution layer 330 has an input size of 112×112×32, a pointwise convolution with a stride of 1 and a filter shape of 1×1×32×64, batch normalization, ReLU activation, and an output size of 112×112×64.

Convolution layer 321 has an input size of 112×112×64, a depthwise convolution with a stride of 2 and a filter shape of 3×3×64, batch normalization, ReLU activation, and an output size of 56×56×64. Convolution layer 331 has an input size of 56×56×64, a pointwise convolution with a stride of 1 and a filter shape of 1×1×64×128, batch normalization, ReLU activation, and an output size of 56×56×128.

Convolution layer 322 has an input size of 56×56×128, a depthwise convolution with a stride of 1 and a filter shape of 3×3×128, batch normalization, ReLU activation, and an output size of 56×56×128. Convolution layer 332 has an input size of 56×56×128, a pointwise convolution with a stride of 1 and a filter shape of 1×1×128×128, batch normalization, ReLU activation, and an output size of 56×56×128.

Convolution layer 323 has an input size of 56×56×128, a depthwise convolution with a stride of 2 and a filter shape of 3×3×128, batch normalization, ReLU activation, and an output size of 28×28×128. Convolution layer 333 has an input size of 28×28×128, a pointwise convolution with a stride of 1 and a filter shape of 1×1×128×256, batch normalization, ReLU activation, and an output size of 28×28×256.

Convolution layer 324 has an input size of 28×28×256, a depthwise convolution with a stride of 1 and a filter shape of 3×3×256, batch normalization, ReLU activation, and an output size of 28×28×256. Convolution layer 334 has an input size of 28×28×256, a pointwise convolution with a stride of 1 and a filter shape of 1×1×256×256, batch normalization, ReLU activation, and an output size of 28×28×256.

Convolution layer 325 has an input size of 28×28×256, a depthwise convolution with a stride of 2 and a filter shape of 3×3×256, batch normalization, ReLU activation, and an output size of 14×14×256. Convolution layer 335 has an input size of 14×14×256, a pointwise convolution with a stride of 1 and a filter shape of 1×1×256×512, batch normalization, ReLU activation, and an output size of 14×14×512.

The five (5) convolution layers 326 have an input size of 14×14×512, a depthwise convolution with a stride of 1 and a filter shape of 3×3×512, batch normalization, ReLU activation, and an output size of 14×14×512. The five (5) convolution layers 336 have an input size of 14×14×512, a pointwise convolution with a stride of 1 and a filter shape of 1×1×512×512, batch normalization, ReLU activation, and an output size of 14×14×512.

Convolution layer 327 has an input size of 14×14×512, a depthwise convolution with a stride of 2 and a filter shape of 3×3×512, batch normalization, ReLU activation, and an output size of 7×7×512. Convolution layer 337 has an input size of 7×7×512, a pointwise convolution with a stride of 1 and a filter shape of 1×1×512×1024, batch normalization, ReLU activation, and an output size of 7×7×1024.

Convolution layer 328 has an input size of 7×7×1024, a depthwise convolution with a stride of 2 and a filter shape of 3×3×1024, batch normalization, ReLU activation, and an output size of 7×7×1024. Convolution layer 338 has an input size of 7×7×1024, a pointwise convolution with a stride of 1 and a filter shape of 1×1×1024×1024, batch normalization, ReLU activation, and an output size of 7×7×1024.

Average pooling layer 340 has an input size of 7×7×1024, a pool size of 7×7, and an output size of 1×1×1024. Fully-connected layer 350 has an input size of 1×1×1024, a size of 1024×1000, and an output size of 1×1×1000. Classifier layer 360 has an input size of 1×1×1000, a Softmax normalization and an output size of 1×1000.

While MobileNets has been transformative, even further compression of this CNN architecture is valuable in order to make a wider range of applications available on constrained platforms. Quantizing the weights of MobileNets to binary (−1,1) or ternary (−1,0,1) values may achieve significant improvement in energy savings and possibly overall throughput especially on custom hardware, such as ASICs and FPGAs while reducing the resultant model size considerably. This is attributed to the replacement of multiplications by additions in binary-weight and ternary-weight networks. Multipliers occupy considerably more area on chip than adders, and consume significantly more energy than addition operations. A specialized hardware can therefore trade off multiplications against additions and potentially accommodate considerably more adders than multipliers to achieve a high throughput and significant savings in energy for binary-weight and ternary-weight networks.

However, prior approaches to binary and ternary quantization incur significant drop in prediction accuracy for MobileNets. Recent work on StrassenNets presents a more mathematically profound way to approximate matrix multiplication computation (and, in turn, convolutions) using mostly low-precision, ternary weights and a few full-precision or high-precision weights. It essentially exploits Strassen's algorithm to approximate a matrix multiplication of a weight matrix with feature maps, where the elements of the product matrix are generated by different combination of few intermediate terms through additions.

Computation of each of the intermediate terms requires a multiplication along with combination of different elements of weights and feature maps through additions. The number of intermediate terms (also called hidden layer width) in StrassenNets therefore determines the addition and multiplication budget of a convolutional layer and in turn decides the approximation error of the corresponding convolution operation. While the results in using StrassenNets demonstrates no loss in predictive performance when compared to high-precision models for few networks, the effectiveness of StrassenNets is quite variable, however, depending on the neural network architecture. For example, while "strassenifying" is effective in reducing the model size of DS convolutional layers, this might come with a prohibitive increase in the number of addition operations, reducing the energy efficiency of neural network inference.

The exorbitant increase in additions primarily stems from the use of wide hidden layers for closely approximating each convolutional filter in a network layer. While this might be required for some of the convolutional filters in a layer, all filters may not require wide strassenified hidden layers. As different filters in a network layer tend to capture different features, they may respond differently to ternary quantization, and, in turn, to "strassenified" convolution with a specific hidden layer units. Some filters can be harder to approximate using ternary bits than others, and have larger impact on the model accuracy loss. Furthermore, given a constrained hidden layer budget for StrassenNets, a group of filters extracting fairly similar features at a layer may respond favorably to ternary quantization, while other filters of the layer extracting significantly different features from those may not.

Embodiments of the present disclosure advantageously provide layer-wise hybrid filter banks for ANNs that provide start-of-the-art accuracy levels while requiring a fraction of the model size and considerably fewer MAC and multiplication operations per inference. The end-to-end learning of hybrid filter banks makes this possible by keeping precision critical convolutional filters in high-precision values and "strassenifying" quantization tolerant filters only to ternary values. The filters that are most sensitive to quantization errors perform traditional convolutions with input feature maps, whereas ternary quantization tolerant filters can perform strassenified convolutions using narrow hidden layers.

In certain embodiments, this quantization scheme may be applied to the MobileNets-V1 architecture. The hybrid filter banks for MobileNets achieves a 46.4% reduction in multiplications, and a 51.07% reduction in model size while incurring modest increase in additions. This translates into a 27.98% savings in energy required per inference while ensuring no degradation in throughput on a DNN hardware accelerator consisting of both MAC and adders when compared to the execution of baseline MobileNets on a MAC-only hardware accelerator. The hybrid filter banks accomplishes this with a very minimal loss in accuracy of 0.51%. These embodiments advantageously quantize the already compute-efficient MobileNets architecture to ternary values with a negligible loss in accuracy on a large-scale dataset, such as ImageNet.

Quantization is one approach to make DNNs, in particular convolutional neural networks (CNNs), less resource demanding.

For example, ternary weight quantization may be applied over the baseline MobileNets-V1 architecture. This method approximates a high-precision weight $W^{fp}$ by a ternary-valued $W^t$ and a scaling factor such that $W^{fp}$ scaling factor*$W^t$. Ternary quantization of the weights of MobileNets achieves substantial reduction in model size but at the cost of significant drop (i.e., 9.66%) in predictive performance when compared to the high-precision model. Any increase in the size of the MobileNets architecture to recover the accuracy loss while using ternary quantization will lead to a significant increase in the number of addition operations.

In another example, Strassen-Nets may achieve near state-of-the-art accuracy for a number of deep CNNs while maintaining acceptable increase in addition operations. Given two, 2×2 square matrices, Strassen's matrix multiplication algorithm requires 7 multiplications to compute the product matrix instead of the 8 required with a naive implementation of matrix multiplication. It essentially casts the matrix multiplication as a 2-layer sum-product network (SPN) computation, as given by Equation 1.

$$\mathrm{vec}(C) = W_c[(W_{b\mathrm{vec}}(B)) \odot (W_a \mathrm{vec}(A))] \quad \mathrm{Eq.}\ 1$$

Where $W_a$, $W_b \in K^{r \times n2}$ and $W_c \in K^{n2 \times r}$ represent ternary matrices with $K \in \{-1, 0, 1\}$, vec(A) and vec(B) denote the vectorization of the two input matrices A, $B \in R^{n \times n}$, $\odot$ represents the elementwise product, and vec(C) is the vectorized form of the product A×B matrix. The $W_a$vec(A) and $W_b$vec(B) of the SPN combine the elements of A and B through additions, and/or subtractions by using the two associated ternary matrices $W_a$ and $W_b$ respectively to generate r intermediate terms each. The two generated r-length intermediate terms are then elementwise multiplied to compute the r-length ($W_b$vec(B)) ($W_a$vec(A)) vector. The outmost ternary matrix $W_c$ later combines these intermediate r terms through additions, and/or subtractions to produce vec(C). Hence, the number of multiplications and additions required for the Strassen's matrix multiplication algorithm are decided by the width of the hidden layer of the SPN, r. Given two 2×2 matrices, for example, ternary matrices $W_a$, $W_b$, and $W_c$ with sizes of 7×4, 7×4, and 4×7 respectively can multiply them using 7 multiplications instead of 8.

While Strasssen's algorithm requires a hidden layer with 7 units here to compute the exact product matrix, StrassenNets instead realizes approximate matrix multiplications in DNN layers using fewer hidden layer units. A convolutional operation in DNN layers can be reduced to a general matrix multiplication (GEMM). In the context of "Strassenified" matrix multiplications of a network layer, A is associated with the weights or filters of the layer and B is associated with the corresponding activations or feature maps. As a result, after training, $W_a$ and vec(A) can be collapsed into a vector a=$W_a$vec(A), as they are both fixed during inference.

StrassenNets trains an SPN-based DNN framework end-to-end to learn the ternary weight matrices with significantly fewer hidden layer units from the training data. The learned ternary matrices can then use significantly fewer multiplications than Strassen's algorithm to approximate the otherwise exact matrix multiplications of the DNN layers. The choice of the width of the hidden layer of the SPNs allows StrassenNets to precisely control over the computational cost and the precision of the approximate matrix multiplication, and, in turn, the predictive performance of the DNN architecture. Significant compression may be achieved by StrassenNets for 3×3 convolutions, as well as increased visibility of DS convolution layers in compute-efficient networks.

Embodiments of the present disclosure apply StrassenNets over MobileNets architecture dominated with DS layers to advantageously reduce computational complexity and model size even further.

Further compression of compute-efficient networks will not only improve their energy-efficiency and runtime-efficiency leading to longer battery life, but also will create opportunities for more complex applications with stringent real-time requirements to fit in the limited memory budget and to run in the limited silicon area of emergent DNN hardware accelerators. Among the various MobileNets architectures, embodiments of the present disclosure quantize MobileNets-V1, which stacks one 3×3 convolutional layer and 13 DS convolutional layers. A DS convolution first convolves each channel in the input feature map with a separate 2-D filter (depth-wise convolution) and then uses 1×1 pointwise convolutions to combine the outputs in the depth dimension.

While "strassenifying" MobileNets is effective in significantly reducing the number of multiplications and the model size, this technique may prohibitively increase additions to preserve the predictive performance of the baseline MobileNets with 16-bit floating-point weights.

FIG. 6 presents table 400 that depicts test accuracy and other data, in accordance with embodiments of the present disclosure.

The other data include the number of multiplications, additions, operations and model size for MobileNets-V1 and "strassenified" MobileNets-V1 (ST-MobileNets) with the width multiplier 0.5 on ImageNet dataset, r is the hidden layer width of a "strassenified" convolution layer, $c_{out}$ is the number of output channels of the corresponding convolution layer, and MACs represents the number of multiply-and-accumulate operations.

The strassenified MobileNets with the r=2$c_{out}$ configuration achieves a comparable accuracy to that of the high-precision MobileNets while reducing multiplications by 97.91% but increasing additions by 317.59% (149.49M MACs of MobileNets vs. 3.11M multiplications and 624.27M additions of ST-MobileNets with r=2$c_{out}$). This in turn offers modest savings in energy required per inference but causes significant degradation in throughput, as discussed below. The performance of StrassenNets for a number of potential values of the hidden layer width (r) are provided in Table 200. The use of fewer hidden units, e.g., r=$c_{out}$ rather than the r=2$c_{out}$ configuration, incurs a significant accuracy loss of 3.4%.

While "strassenifying" traditional 3×3 or 5×5 convolutional layers marginally increases the addition operations, that trend does not hold true when StrassenNets is applied over MobileNets dominated with DS layers because the computational cost of a neural network with DS layers is dominated by 1×1 pointwise convolutions. Accordingly, "strassenifying" a 1×1 convolution requires executing two equal-sized (for r=$c_{out}$) 1×1 convolutions with ternary weights along with a few elementwise multiplications in place of the standard 1×1 convolution. This in turn causes a significant increase (2:1 or 100%) in additions when compared to the execution of the standard 1×1 pointwise convolution.

Figure 7:
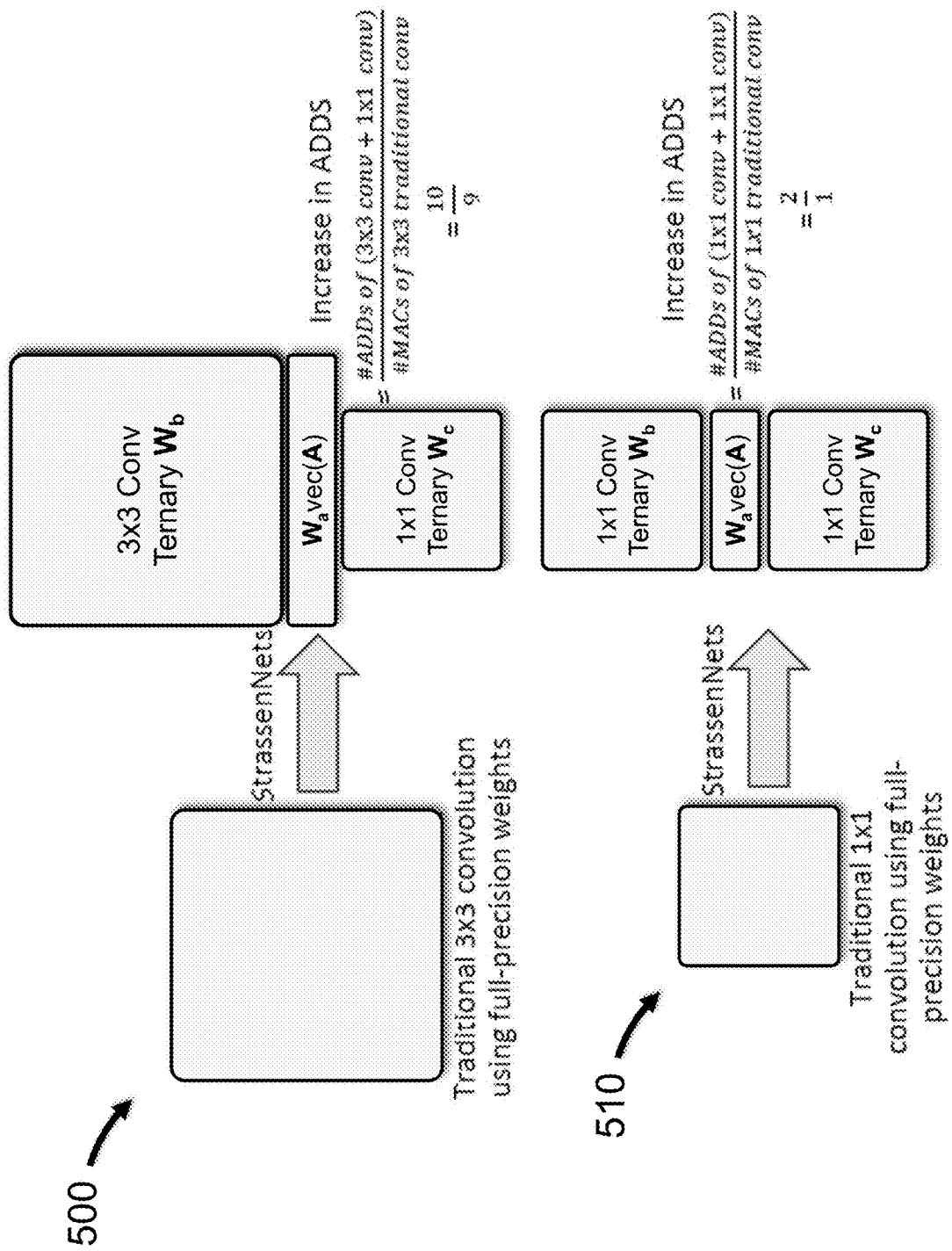
FIG. 7 depicts the variance in filter sensitivity to quantization for two filters, in accordance with an embodiment of the present disclosure.

FIG. 7 depicts the variance in filter sensitivity to quantization for filter 500 and filter 510, in accordance with an embodiment of the present disclosure.

Filter 500 is a 3×3 and filter 510 is a 1×1 convolution. The cost of elementwise multiplication with intermediate $W_a$vec(A) is comparably negligible and hence is ignored in estimating the increase in additions. On the other hand, as FIG. 7 also illustrates, a 3×3 "strassenified" convolution with r=$c_{out}$ instead requires executing a 3×3 convolution and a 1×1 convolution with ternary weights in conjunction with few elementwise multiplications. This in turn results in a marginal increase (10.9 or 11.1%) in additions in comparison to the execution of the standard 3×3 convolution. This overhead of addition operations with applying StrassenNets to DS convolution layers goes up in proportion to the width of the hidden layers, i.e., to the size of the ternary convolution operations, as observed in table 400, reducing the throughput and energy-efficiency of neural network inference.

A modest (29.63%) increase in the number of addition operations for the "strassenified" ResNet-18 architecture dominated with 3×3 convolutions produces comparable accuracy, this does not continue once StrassenNets is applied over MobileNets. This also indicates that the DS convolutions, owing to efficiency in number of parameters than 3×3 convolutions, are more prone to quantization error and this manifests when StrassenNets is applied. Considering the fact that MAC operations typically consume about five times more energy than addition operations for 16-bit floating-point values, as discussed below, a 317.59% increase in additions in place of about 98% saving on multiplications will result in diminishing or no returns in terms of energy savings and runtime speedups even on specialized hardware dominated with adders. The increase in computational costs of MobileNets with applying StrassenNets along with the high accuracy and stringent real-time requirements of new applications on highly constrained devices necessitate a model architecture exploration that can exploit the compute efficiency of DS layers and the model size reduction ability of StrassenNets while maintaining acceptable or no increase in additions.

The accuracy drop using a "strassenified" MobileNets with the $r=c_{out}$ configuration essentially indicates that each layer perhaps introduces a certain amount of quantization error owing to lower hidden width and that error accrues over multiple quantized layers. On the other hand, although a strassenified MobileNets with $r=2c_{out}$ recovers the accuracy loss of the $r=c_{out}$ configuration, it makes a strong assumption that all filters require wider "strassenified" hidden layers to quantize to ternary values to preserve the representational power of the baseline high-precision network. While this might be true for some of the convolutional filters, not all filters need to be quantized using the $r=2c_{out}$ configuration, which stems from at least two reasons: different sensitivity of individual filters to StrassenNets, and different sensitivity of group of filters to StrassenNets.

With respect to different sensitivity of individual filters to StrassenNets, different convolutional filters tend to extract different type of features, ranging from simple features (e.g., edge detection) to more complicated higher-level (e.g., facial shapes) or object specific features. As a result, different filters may respond differently to ternary quantization. In other words, there are filters that are easy to quantize to ternary values using narrower hidden layers while still ensuring low L2 reconstruction error in output feature maps. On the other hand, there are weight filters that require wider strassenified hidden layers to ensure a low or modest L2 loss.

FIG. 8A depicts the variance in the sensitivity of filters 600 and 602 to quantization, in accordance with embodiments of the present disclosure.

Given a feature map, FIG. 8A presents a scenario where a "strassenified" vertical lines detector (filter 600) with fewer hidden layer units can closely approximate the output map (with low L2 reconstruction loss) produced otherwise using its high-precision counterpart. However a convolutional filter that sharpen images (filter 602) requires a wider hidden layer to ensure a low L2 loss. While filters 600 and 602 are two-dimensional filters, three-dimensional filters also exhibit this difference in complexity.

With respect to different sensitivity of group of filters to StrassenNets, groups of convolutional filters exist at each layer that either tend to extract fairly similar features with slightly different orientations (e.g., two filters attempting to detect edges rotated by few degrees) or have other numerical-structural similarities. As a result, when these groups of convolutional filters are quantized to ternary values using StrassenNets, they may share many hidden layer elements. These groups of convolutional filters with similar value structure in turn are more amenable to quantization using fewer hidden layer units than filters with no common value structure. Given a constrained hidden layer budget for StrassenNets (e.g., $r=c_{out}$), these groups of convolutional filters may together respond well to ternary quantization while other dissimilar filters struggle to be strassenified alongside them with low quantization error, due to the restricted hidden layer bandwidth.

FIG. 8B depicts the ease of ternary quantization for a filter bank 610 with no common values, in accordance with embodiments of the present disclosure. FIG. 8B illustrates a case when two filters $f_j$ and $f_k$, having no common values, performs a convolution with a 2×2 feature map using 7 multiplications. A set of ternary weight matrices is shown in FIG. 8B.

FIG. 8C depicts the ease of ternary quantization for a filter bank 620 with common values, in accordance with embodiments of the present disclosure. FIG. 8C illustrates a case when two filters $f_j$ and $f_k$, having some common values, performs a convolution with a 2×2 feature map using only 6 multiplications instead of the 7 required otherwise for unique filters lacking common values. A set of ternary weight matrices is shown in FIG. 8C.

Embodiments of the present disclosure advantageously provide a novel quantization method—one that will only quantize easy-to-quantize weight filters of a network layer to ternary values to restrict the increase in additions, while also preserving the representational ability of the overall network by relying on few high-precision difficult-to-quantize weight filters. This layer-wise hybrid filter bank strategy exploits a high-precision network's strength as a highly-accurate classifier and couples that with Strassen-Nets to achieve significant reduction in model size and number of multiplications. This quantization technique essentially maintains a good balance between overall computational costs and predictive performance of the overall network.

Embodiments of the present disclosure also provide a quantization method that can quantize a substantial fraction of convolutional filters to ternary values at each layer while relying on few remaining high-precision filters to preserve the representational power of the original high-precision network. As easy-to-quantize filters are quantized only using StrassenNets leaving the difficult-to-quantize filters in high-precision values, this should in turn require narrow hidden layers for quantizing them resulting in an overall reduction in computations (additions along with MAC operations) and memory footprint while ensuring no loss in accuracy. This is in sharp contrast to quantizing all the filters of each layer using wide hidden layers to preserve the representational power of MobileNets which led to significant increase in additions.

In certain embodiments, the same input feature map is convolved with full precision weight filters and ternary weight filters in parallel, concatenating the feature maps from each convolutions into an unified feature map. This concatenated feature map is fed as input to the next network layer. At each layer, the combination of the two convolutions from high-precision and ternary filters ensures that they combine to form an output feature map of identical shape as in the baseline high-precision network. For example, given an input feature map with $c_{in}$ channels, the quantization technique applies a traditional convolution with k high-precision weight filters $W_{fp}$ of shape $c_{in} \times w_k \times h_k$ and a strassen convolution with $c_{out} \times k$ ternary weight filters $W_t$ to produce a feature map of total $c_{out}$ channels for a layer. Here, $c_{out}$ is the number of channels in the output volume of the corresponding convolution layer in the baseline high-precision network, and $w_k$, $h_k$ are the kernel size. For clarity, a bias term is not included. The fraction of channels generated in an output feature map from the high-precision weight filters, α, is a hyperparameter that decides the representational power and computational costs of MobileNets with hybrid filter banks. The channels generated from the ternary weight filters are given by 1−α.

Figure 9:
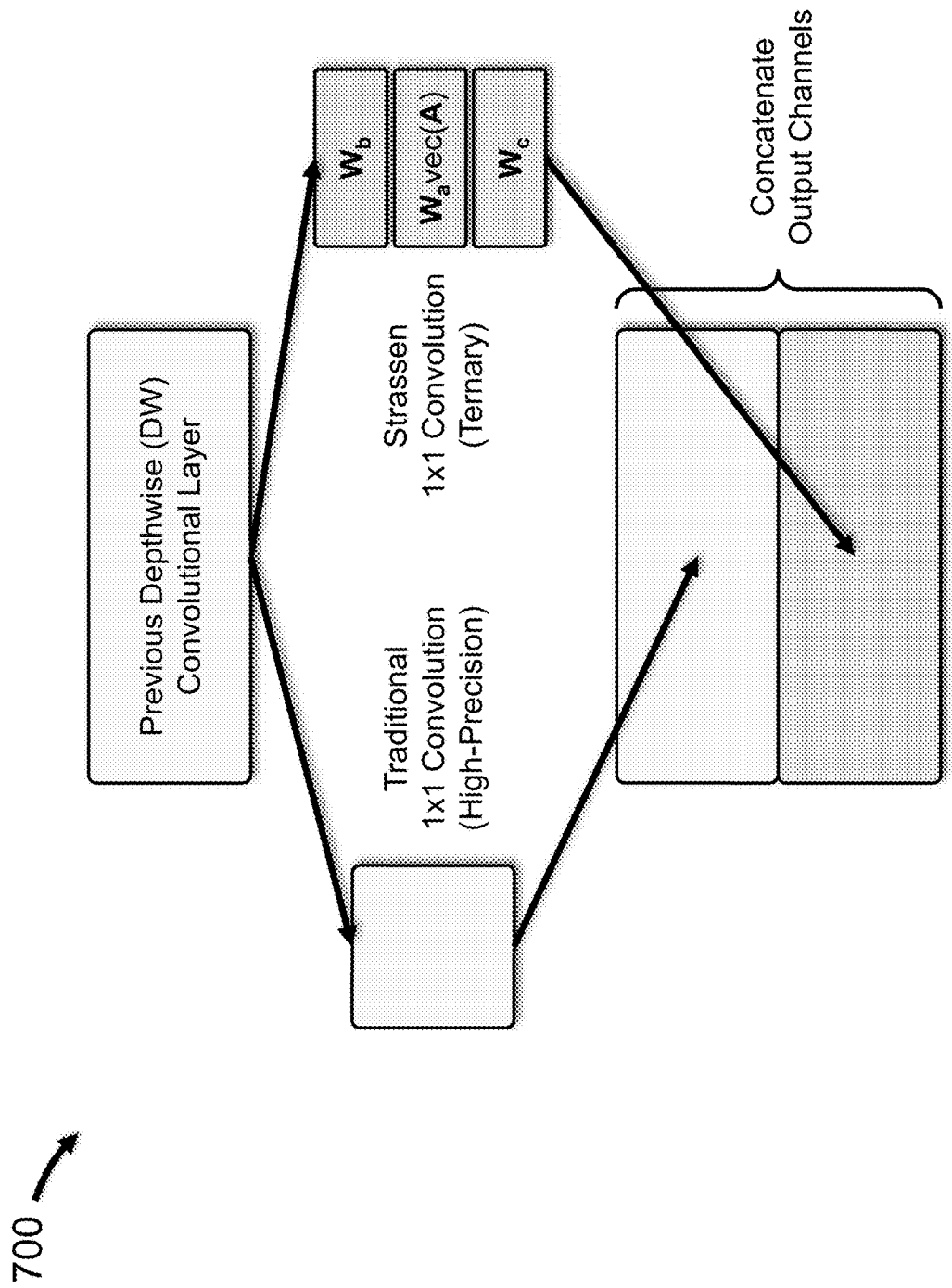
FIG. 9 depicts a MobileNets mixed-precision, pointwise convolution layer with hybrid filter banks, in accordance with an embodiment of the present disclosure.

FIG. 9 depicts a MobileNets mixed-precision, pointwise convolution layer 700 with hybrid filter banks, in accordance with an embodiment of the present disclosure.

FIG. 9 shows the organization of the hybrid filter banks for a MobileNets mixed-precision layer, in accordance with an embodiment of the present disclosure. Each of the convolutional layers of MobileNets, including the 3×3 layer and the 1×1 pointwise convolutions of the following 13 depthwise-separable (DS) layers, are quantized using hybrid filter banks, where a % of the output channels at each mixed-precision layer are generated using high-precision weight filters (e.g., 16-bit floating point) and the remaining output channels are generated using low-precision weight filters (e.g., scaled, ternary filters).

The depth-wise (DW) convolutions of the depthwise-separable layers are not quantized using either StrassenNets or hybrid filter banks; in other words, these layers are high-precision layers. This is primarily because they do not dominate the compute bandwidth of MobileNets, and quantizing those to ternary values hurt the accuracy significantly without offering any significant savings in either model size or computational costs. The "strassenified" convolutions portion of hybrid filter banks at each mixed-precision layer are quantized using a number of r values, where r is the hidden layer width of a "strassenified" convolution layer. The r≪2$c_{out}$ configuration in conjunction with an optimal non-zero should offer substantial savings in model size and addition operations without compromising accuracy in comparison to a fully "strassenified" MobileNets architecture with r=2$c_{out}$ configuration. Other embodiments may apply this quantization technique to fully-connected layers. In certain embodiments, the last fully-connected layer of MobileNets may be uniformed compressed using StrassenNets.

With respect to training, the high-precision filters along with the low-precision, strassenified weight filters for each mixed-precision layer are trained jointly so as to maximize accuracy. A gradient-descent (GD) based training algorithm is used to train the network with hybrid filter banks end-to-end. Before the training begins, depending on the value of α, the top α$c_{out}$ channels of a feature map are configured to generate from high-precision traditional convolutions, and the remaining 1−α$c_{out}$ channels are forced to generate from low-precision, ternary "strassenified" convolutions. The order of the channels generated in the output feature volume by either high-precision filters or low-precision, ternary filters is flexible, because the output feature map comprising all the channels generated forms the input of the subsequent layer and the weights in the subsequent layer can be adjusted accordingly. During the end-to-end training process, the organization of hybrid filter banks tend to influence the difficult-to-quantize filters that require high-precision filters to extract features to be trained using high-precision values, and the filters that are less susceptible to ternary quantization to be trained using low-precision, ternary values from "strassenified" convolutions.

In certain embodiments, in order to recover any accuracy loss of the hybrid MobileNets compressed with "strassenified" matrix computations, knowledge distillation may be used during training. Knowledge distillation allows an uncompressed teacher network to transfer its prediction ability to a compressed student network by navigating its training. In these embodiments, the teacher network includes the uncompressed MobileNets with per-layer hybrid filter banks, and the student network is the compressed network with low-precision, ternary weight matrices.

In one embodiment, the MobileNets-V1 architecture was modified to include per-layer hybrid filter banks to create a "Hybrid MobileNets" model and trained on the ImageNet dataset. The MXNet framework based GluonCV toolkit3 may be used to train the network using a width multiplier of 0.52 to reduce training costs with limited GPU resources. The high-precision filters of the hybrid filter banks use 16-bit floating-point weights, and the activations are quantized to 16-bit floating-point values. In other embodiments, the weights and activations may be represented by 8-bit values, 32-bit floating-point values, 64-bit floating point values, etc.

The Nesterov accelerated gradient (NAG) optimization algorithm may be used, as well as the other training hyperparameters, for training the Hybrid MobileNets. First, Hybrid MobileNets is trained with high-precision Strassen matrices ($W_a$, $W_b$, and $W_c$) for 200 epochs. With a mini-batch size per GPU of 128 on a 4 GPU system, the initial learning rate is 0.2, and later gradually reduced to zero following a cosine decay function.

Quantization is then activated for these Strassen matrices, and the training continues for another 75 epochs with initial learning rate of 0.02 and progressively smaller learning rates. Quantization converts a high-precision Strassen matrix to a ternary-valued matrix along with a scaling factor (e.g., $W_a$=scaling factor*$W_a$). The L2 distance between their pre-quantization and post-quantization weight vectors may then be measured to confirm that the L2 distances fit a normal distribution, i.e., most filters experience low-to-moderate changes to their weight vectors while a few exceptional filters saw very significant movement. Advantageously, the high-precision filters preserve the overall representational power of the network. Finally, the Strassen matrices of the hybrid filter banks are fixed to their learned ternary values, and training is continued for another 25 epochs with initial learning rate of 0.002 and progressively smaller learning rates to ensure that the scaling factors associated with the ternary matrices can be absorbed by high-precision vec(A) portion of "strassenified" matrix multiplication.

FIG. 10 depicts a table 410 of hyperparameters for training hybrid MobileNets, in accordance with embodiments of the present invention.

In one embodiment, a training set is generated containing 100 k pairs ($A_i$, $B_i$) with values i.i.d. uniform on [−1,1] in $A_i$, and values of a given convolutional filter in $B_i$. The SPN is then trained using different number of hidden units. Training begins with full-precision weights (initialized i.i.d. uniform on [−1,1]) for one epoch with SGD (learning rate 0.1, momentum 0.9, mini-batch size 4), quantization is activated, and then training continues for few epochs with initial learning rate of 0.01 and progressively smaller learning rates. Once the training converges after activation of the quantization, the L2-loss is collected.

The training images from ImageNet are preprocessed by using mean and standard deviation. These images are resized such that the shorter side has length of 256 and are then randomly cropped to 224×224 pixels. Random horizontal flips are applied for data augmentation. The center 224×224 crop of the images are used for evaluation.

Table 410 shows the hyperparameters values used for training Hybrid MobileNets. Similar hyperparameters values are used for training baseline full-precision MobileNets and ST-MobileNets also. The learning rate scheduling involves a 'warm up' period in which the learning rate is annealed from zero to 0.2 over the first 5 epochs, after which it is gradually reduced following a cosine decay function.

FIG. 11 depicts a table 420 of Top-1 and top-5 accuracy (%) of MobileNets (full resolution and multiplier of 0.5) on Imagenet for different number of bits per weight and activation, in accordance with embodiments of the present invention.

Per-layer hybrid filter banks may be executed by any generic HA 170, such as, for example, an HA 170 that includes MAC units. Embodiments of the present disclosure advantageously provide a hardware accelerator, HA 170, that achieves an energy-efficient and runtime-efficient execution of hybrid filter banks dominated by additions. In certain embodiments, HA 170 includes one or more CEs 180 with computation units that have at least two low-cost adders within the same silicon area as a MAC unit. A 16-bit floating-point MAC unit takes about twice the area of a 16-bit floating-point adder. Given a fixed silicon area and a model configuration for Hybrid MobileNets, the ratio of MAC units to adders in the proposed hardware accelerator is decided in such a way that the maximum possible throughput can be achieved for the configuration. In order to estimate the energy required per inference of baseline and proposed models, the energy consumption numbers of 16-bit floating-point adder and MAC unit may be used.

Figure 12:
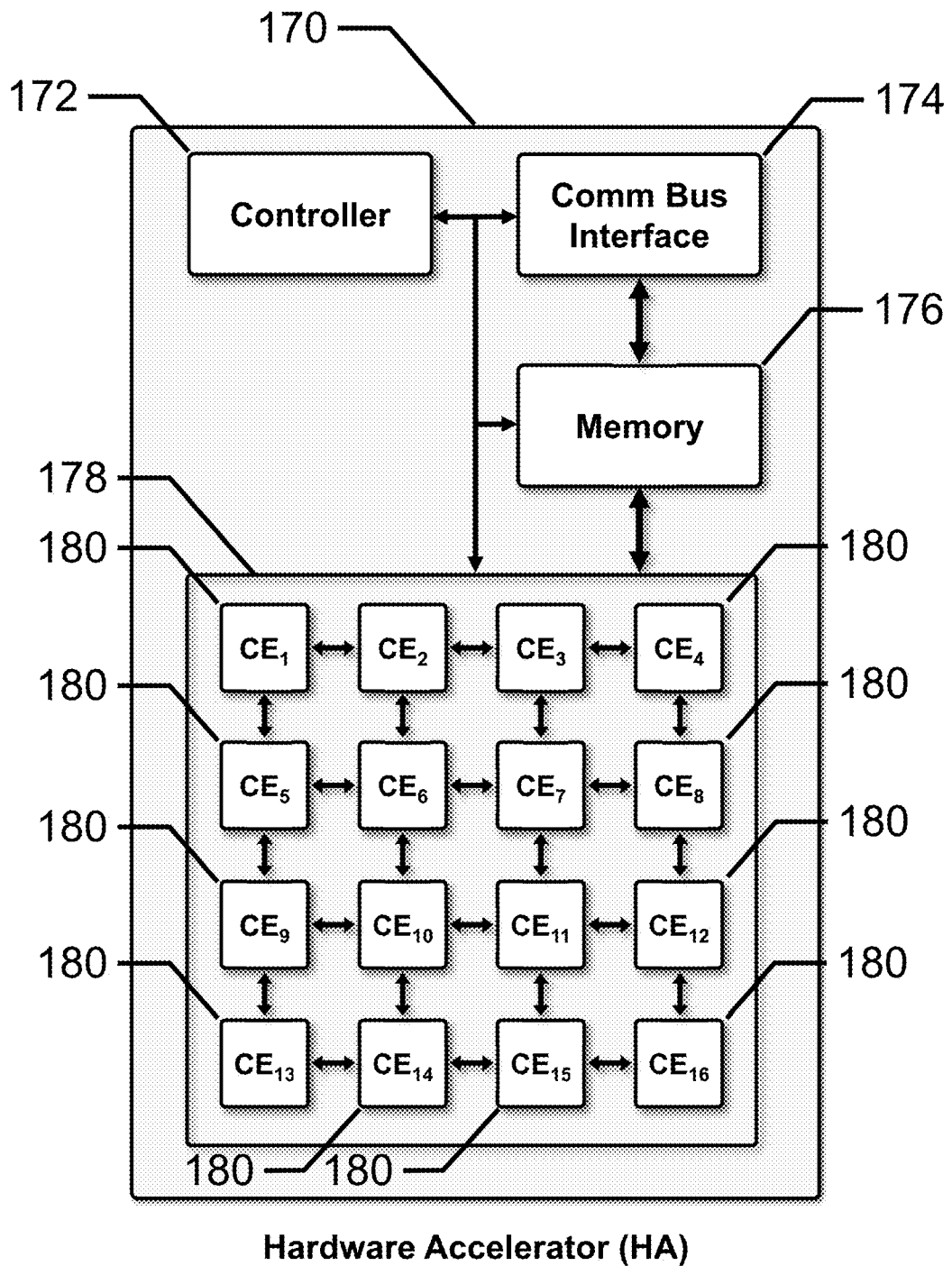
FIG. 12 depicts a block diagram of a hardware accelerator, in accordance with embodiments of the present disclosure.

FIG. 12 depicts a block diagram of HA 170, in accordance with embodiments of the present disclosure.

HA 170 includes controller 172, communication bus interface 174, memory 176 including volatile and/or non-volatile memory (e.g., SRAM, DRAM ROM, flash, etc.), and compute engine (CE) array 178 including at least one CE 180. In many embodiments, CE array 178 includes a number of interconnected CEs 180, such as 4 CEs, 8 CEs, 16 CEs (depicted in FIG. 12), 32 CEs, etc. CEs 180 may be interconnected by a NoC using a ring topology, a star topology, a mesh topology, etc. Alternatively, CEs 180 may be interconnected using a cross-bar switch, direct connections, etc. Generally, each CE 180 may execute a portion of an ANN model using a portion of the ANN weight.

Figure 13:
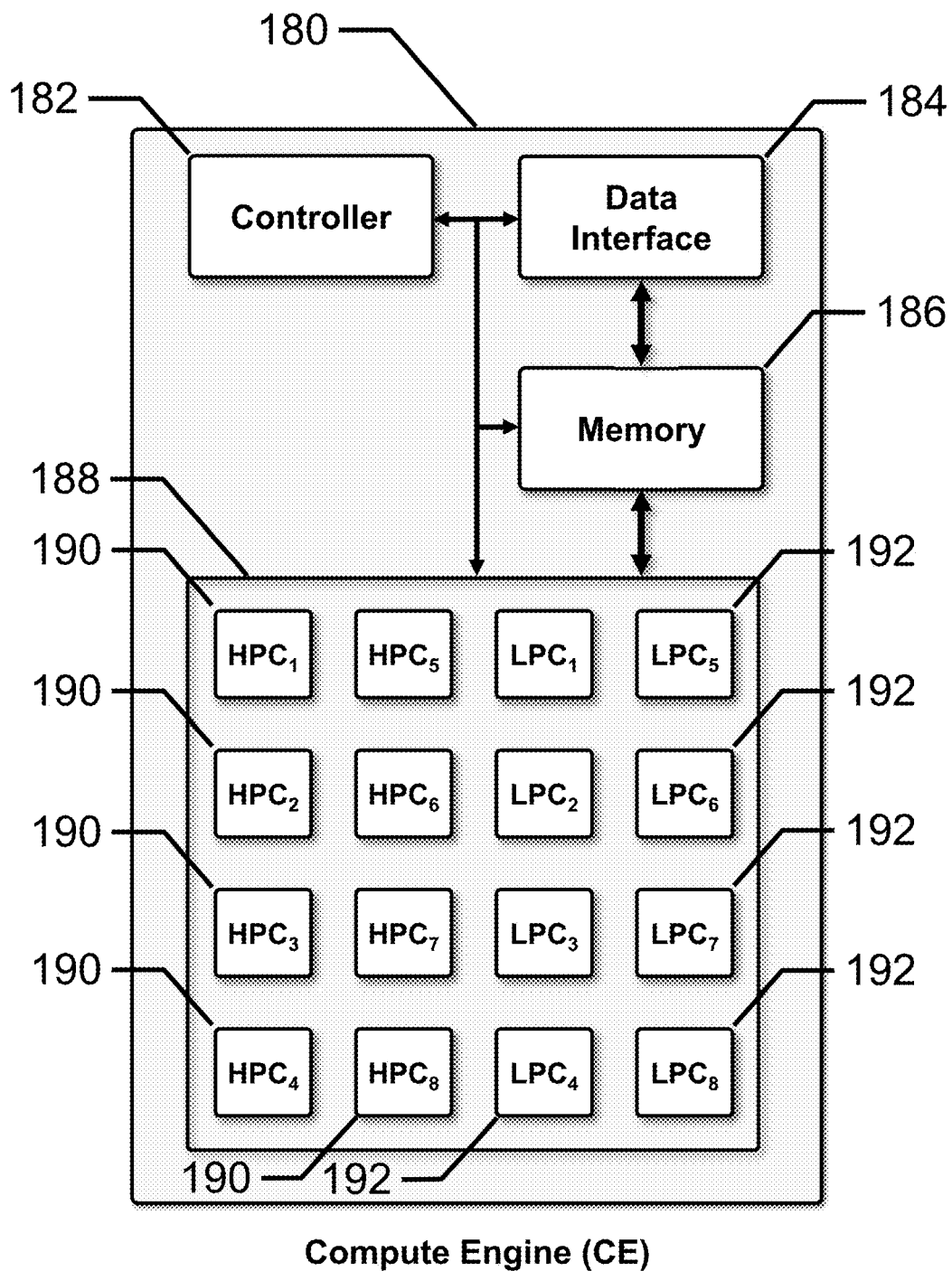
FIG. 13 depicts a block diagram of a compute engine (CE) with high-precision computation (HPC) units and low-precision computation (LPC) units, in accordance with an embodiment of the present disclosure.

FIG. 13 depicts a block diagram of CE 180 with HPC units 190 and LPC units 192, in accordance with an embodiment of the present disclosure. CE 180 includes controller 182, communication bus interface 184, memory 186 including volatile and/or non-volatile memory (e.g., SRAM, DRAM ROM, flash, etc.), and an array 188 of compute units, including HPC units 190 and LPC units 192. FIG. 13 depicts an array of eight (8) HPC units 190 and eight (8) LPC units 192. The ratio of HPC units 190 to LPC units 192 may be governed, in certain embodiments, by a, as discussed above.

Figure 14A:
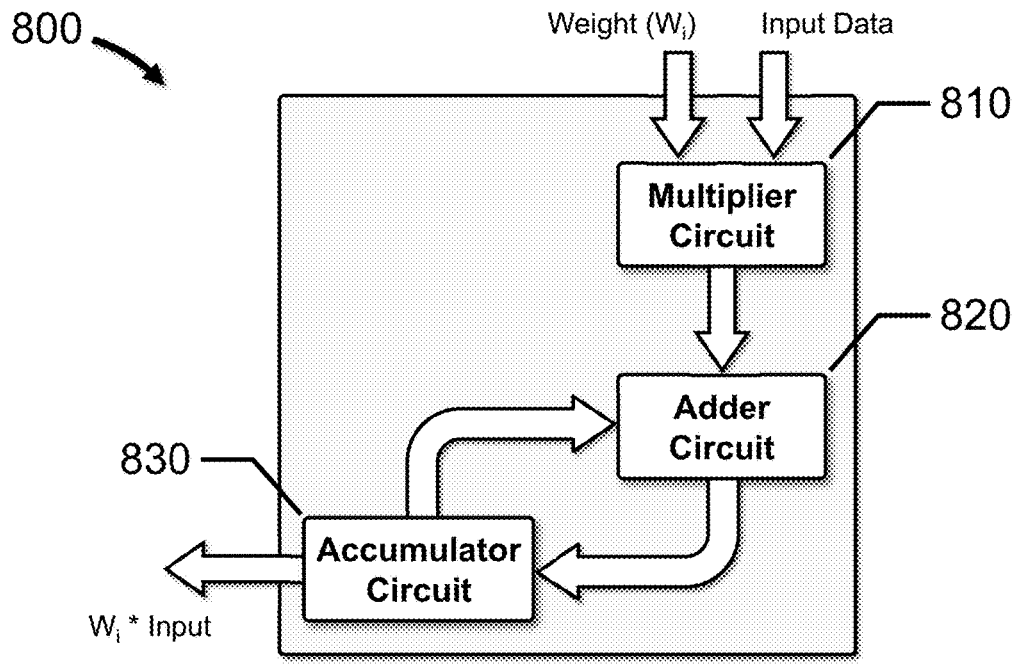
FIG. 14A depicts a block diagram of an HPC unit, in accordance with an embodiment of the present disclosure.

FIG. 14A depicts data flow diagram 800 for HPC unit 190, in accordance with an embodiment of the present disclosure.

HPC unit 190 includes multiplier circuit 810, adder circuit 820 coupled to multiplier circuit 810, and accumulator circuit 830 coupled to adder circuit 820. A controller or control circuitry may also be included. Generally, HPC unit 190 performs a multiply-and-accumulate (MAC) operation on sequences of operand pairs, such as, for example, high-precision weights (W) and high-precision input data values (e.g., feature map data).

For each operand pair in a sequence of operand pairs, multiplier circuit 810 multiplies the operand pair together to generate an intermediate value. Adder circuit 820 adds an accumulated value, received from accumulator circuit 830, to the intermediate value to generate a new accumulated value. Accumulator circuit 830 stores the new accumulated value, and, at the end of the sequence of operand pairs, accumulator circuit 830 outputs a final accumulated value (e.g., $W_i$*input data).

Figure 14B:
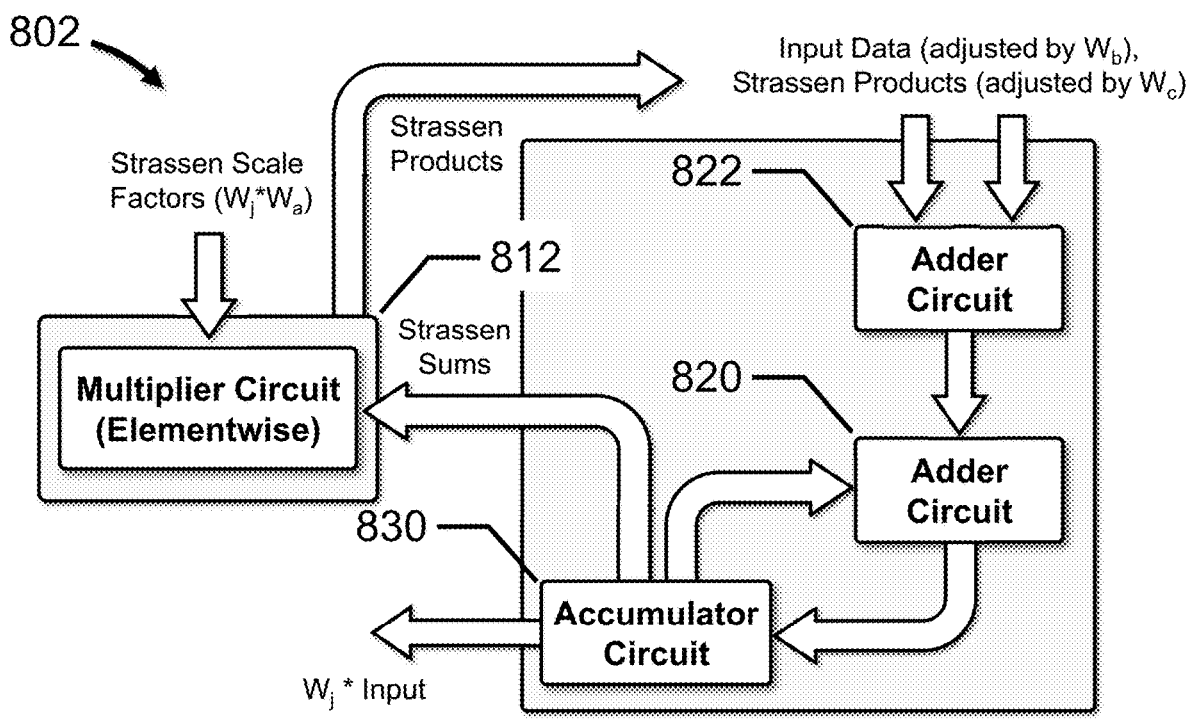
FIG. 14B depicts a block diagram of an LPC unit, in accordance with an embodiment of the present disclosure.

FIG. 14B depicts data flow diagram 802 of LPC unit 192, in accordance with an embodiment of the present disclosure.

LPC unit 192 includes adder circuit 822, adder circuit 820 coupled to adder circuit 822, and accumulator circuit 830 coupled to adder circuit 820. Multiplier circuit 812 is coupled to accumulator circuit 830, and provides intermediate products as input to adder circuit 822. A controller or control circuitry may also be included. Generally, LPC unit 192 performs an add-and-accumulate (AAC) operation on sequences of operand pairs, as well as a multiply (MUL) operation on a sequence of operand pairs. The functioning of LPC unit 192 is discussed with respect to a Strassen calculation (SC); other types of calculations may also be supported.

For the first AAC operation, for each operand pair in the sequence of operand pairs (e.g., input data value values that have been adjusted by Strassen weights $W_b$), adder circuit 822 adds the operand pair to generate an intermediate value. Adder circuit 820 then adds an accumulated value, received from accumulator circuit 830, to the intermediate value to generate a new accumulated value. Accumulator circuit 830 stores the new accumulated value, and, at the end of the sequence of operand pairs, accumulator circuit 830 outputs a final accumulated value (e.g., a Strassen sum). Multiple sequences of operands produce multiple Strassen sums, which are provided to multiplier circuit 812.

For the MUL operation, for each operand pair in the sequence of operand pairs, multiplier circuit 812 multiplies the operand pair (e.g., Strassen sum and Strassen scale factor $W_j$*$W_a$) to generate an intermediate value (e.g., Strassen product), and then outputs the intermediate value (Strassen product). The Strassen products are then adjusted by Strassen weights $W_c$, and provided, as a sequences of operands, to adder circuit 822.

For the second AAC operation, for each operand pair in the sequence of operand pairs (e.g., Strassen products that have been adjusted by Strassen weights $W_c$), adder circuit 822 adds the operand pair to generate an intermediate value. Adder circuit 820 then adds an accumulated value, received from accumulator circuit 830, to the intermediate value to generate a new accumulated value. Accumulator circuit 830 stores the new accumulated value, and, at the end of the sequence of operand pairs, accumulator circuit 830 outputs a final accumulated value (e.g., $W_j$*Input Data).

Figure 15:
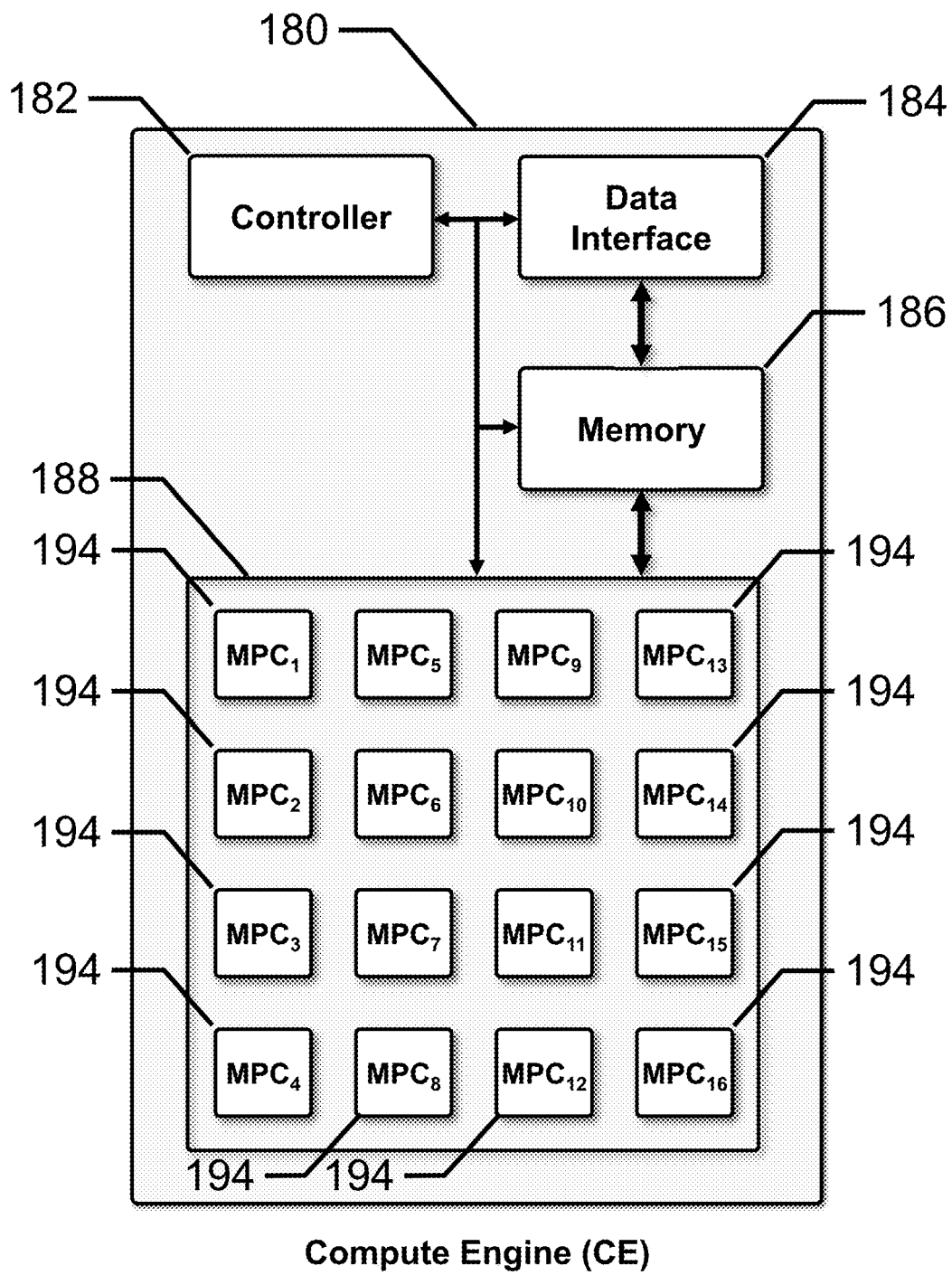
FIG. 15 depicts a block diagram of a CE with mixed-precision computation (MPC) units, in accordance with an embodiment of the present disclosure.

FIG. 15 depicts a block diagram of CE 180 with MPC units 194, in accordance with an embodiment of the present disclosure. CE 180 includes controller 182, communication bus interface 184, memory 186 including volatile and/or non-volatile memory (e.g., SRAM, DRAM ROM, flash, etc.), and an array 188 of MPC units 194. FIG. 15 depicts an array of sixteen (16) MPC units 194.

Figure 16A:
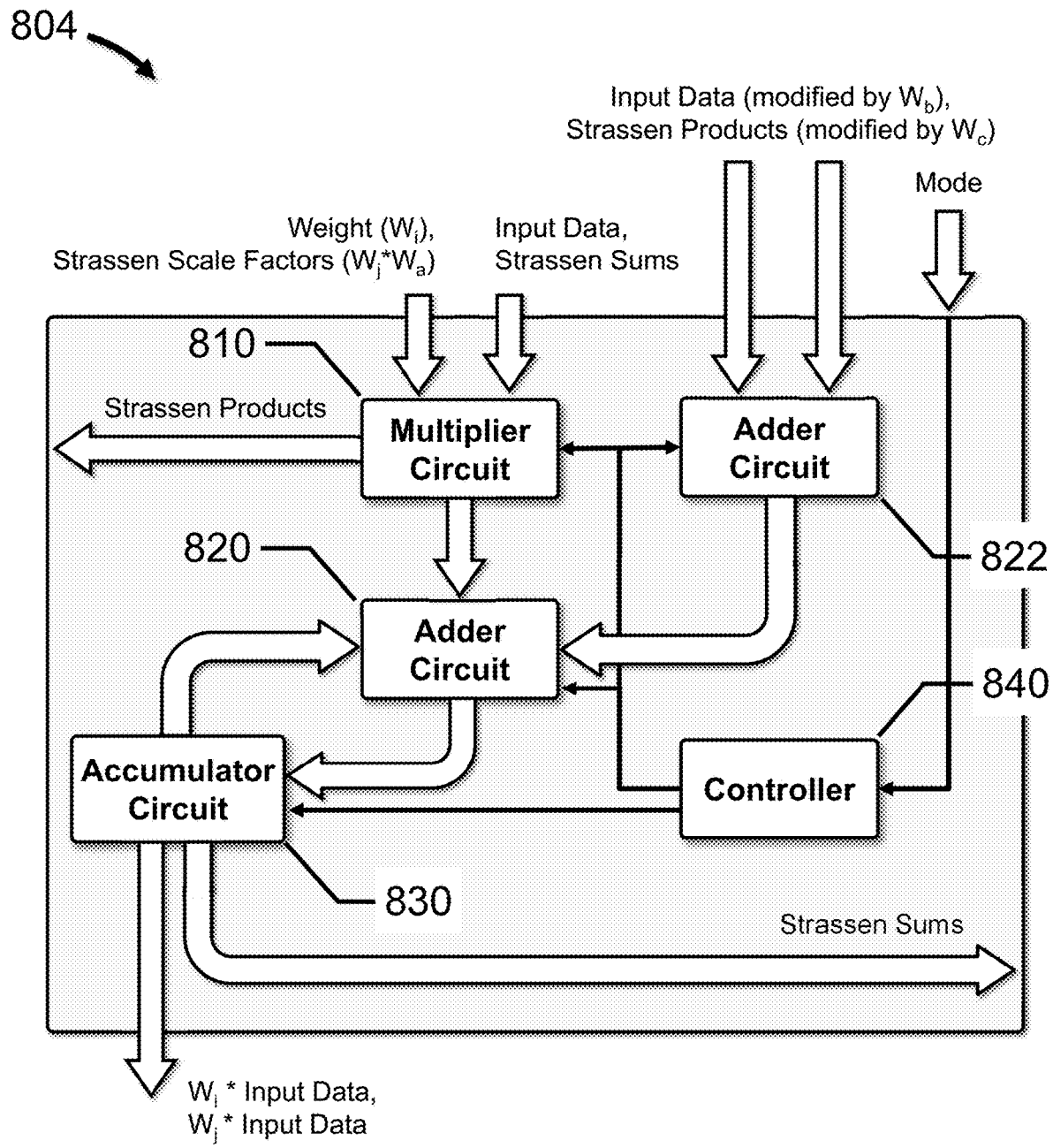
FIG. 16A depicts a block diagram of an MPC unit, in accordance with an embodiment of the present disclosure.

FIG. 16A depicts a data flow diagram 804 of MPC unit 194, in accordance with an embodiment of the present disclosure.

MPC unit 194 includes multiplier circuit 810, adder circuit 820 coupled to multiplier circuit 810, accumulator circuit 830 coupled to adder circuit 820, adder circuit 822 coupled to adder circuit 820, and controller 840 coupled to multiplier circuit 810, adder circuit 820, adder circuit 822, and accumulator circuit 830. Generally, MPC unit 194 performs multiply-and-accumulate (MAC) operations on sequences of operand pairs, such as, for example, high-precision weights (W) and high-precision input data values (e.g., feature map data), add-and-accumulate (AAC) operations on sequences of operand pairs, and multiply (MUL) operations on a sequence of operand pairs.

Generally, controller 840 has a plurality of operating modes. In certain embodiments, the operating modes include a high precision control mode (e.g., HPC), a low precision control add mode (e.g., LPC_Add) and a low precision control multiply mode (e.g., LPC_Multiply); other modes are also contemplated. The operating mode may be controlled by a mode control signal input to controller 840.

The functioning of MPC unit 194 is discussed with respect to a simple high-precision weight calculation as well as a Strassen calculation (SC); other types of calculations are also supported. For example, HPC control mode performs the high-precision weight calculation, while a sequence of LPC_Add, LPC_Multiply and LPC_Add control modes performs the various operations related to the SC.

FIGS. 16B, 16C, 16D and 16E depict data flow diagrams 804-1, 804-2, 804-3 and 804-4, respectively, for different operating modes of MPC unit 194, in accordance with embodiments of the present disclosure.

Figure 16B:
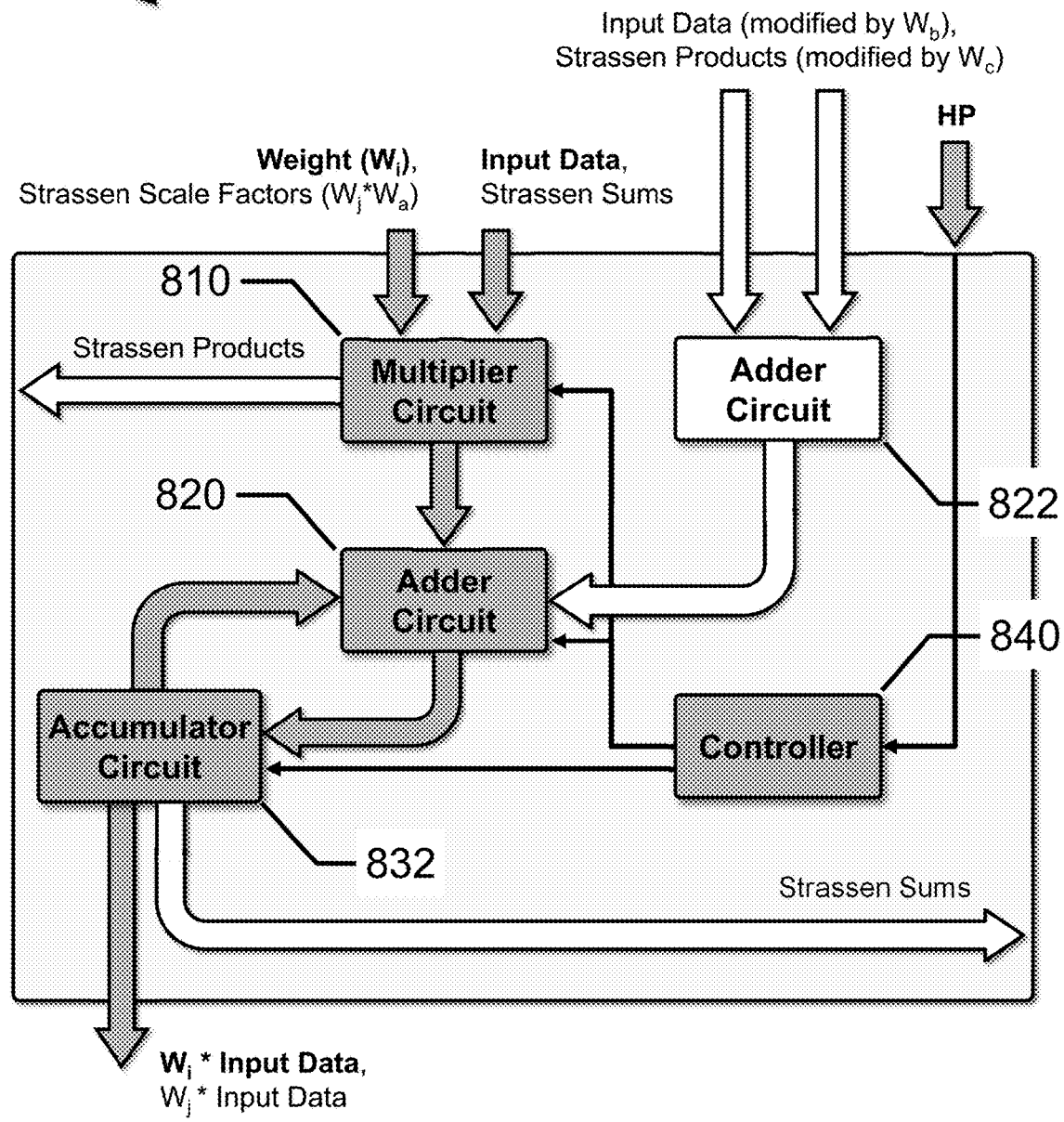
FIGS. 16B, 16C, 16D and 16E depict data flow diagrams for different operating modes of an MPC unit, in accordance with an embodiment of the present disclosure.

FIG. 16B depicts data flow 804-1 for the HP operating mode, in accordance with an embodiment of the present disclosure.

For each operand pair in a sequence of operand pairs, multiplier circuit 810 multiplies the operand pair together to generate an intermediate value. Adder circuit 820 adds an accumulated value, received from accumulator circuit 830, to the intermediate value to generate a new accumulated value. Accumulator circuit 830 stores the new accumulated value, and, at the end of the sequence of operand pairs, accumulator circuit 830 outputs a final accumulated value (e.g., $W_i$*input data).

Figure 16C:
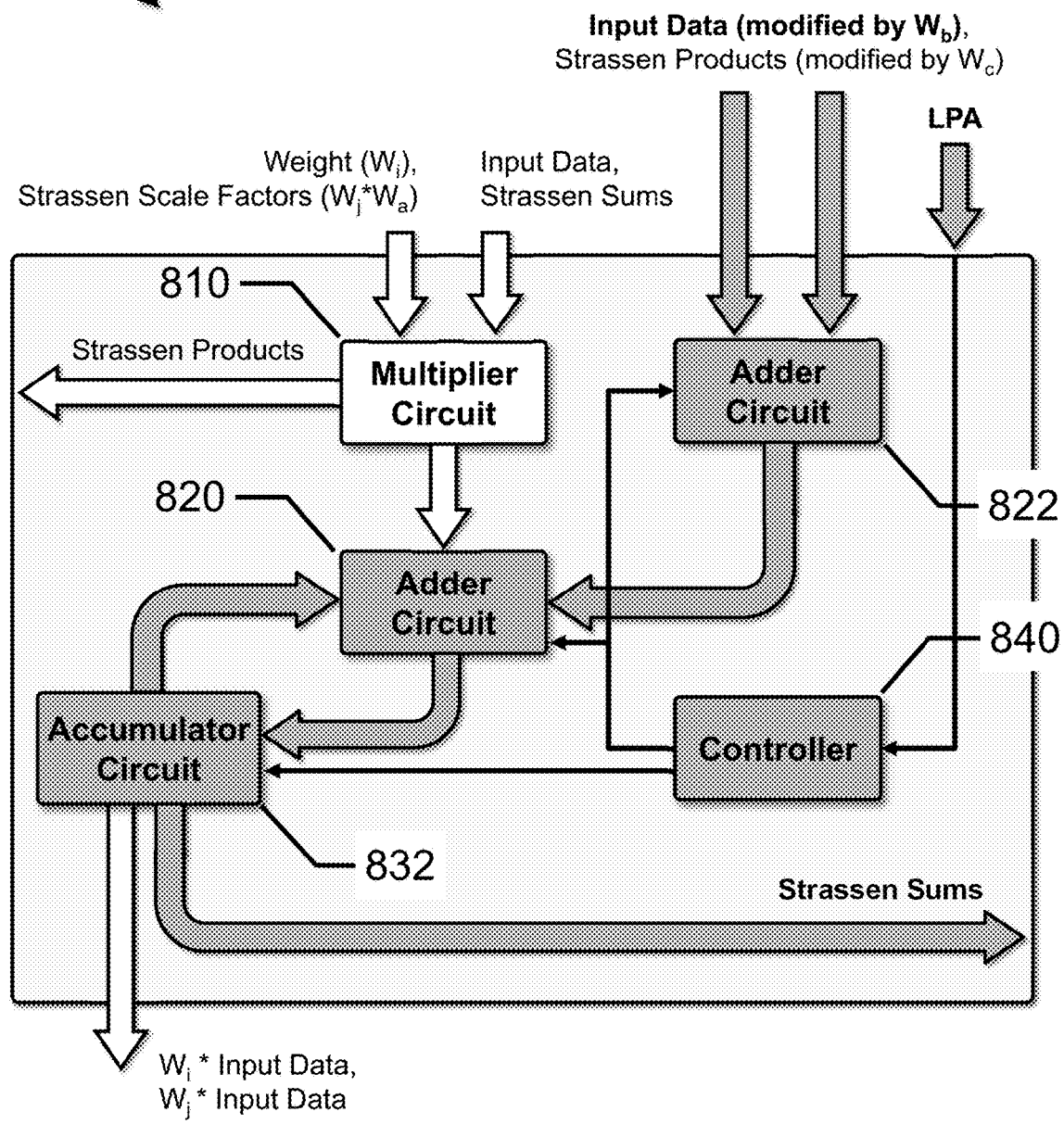

FIG. 16C depicts data flow 804-2 for the LPA operating mode, in accordance with an embodiment of the present disclosure. The functioning of MPC unit 194 is discussed with respect to a Strassen calculation (SC); other types of calculations may also be supported.

For the first AAC operation, for each operand pair in the sequence of operand pairs (e.g., input data value values that have been adjusted by Strassen weights $W_b$), adder circuit 822 adds the operand pair to generate an intermediate value. Adder circuit 820 then adds an accumulated value, received from accumulator circuit 830, to the intermediate value to generate a new accumulated value. Accumulator circuit 830 stores the new accumulated value, and, at the end of the sequence of operand pairs, accumulator circuit 830 outputs a final accumulated value (e.g., a Strassen sum). Multiple sequences of operands produce multiple Strassen sums, which are provided as input to multiplier circuit 810 during the next control mode operation (i.e., LPM).

Figure 16D:
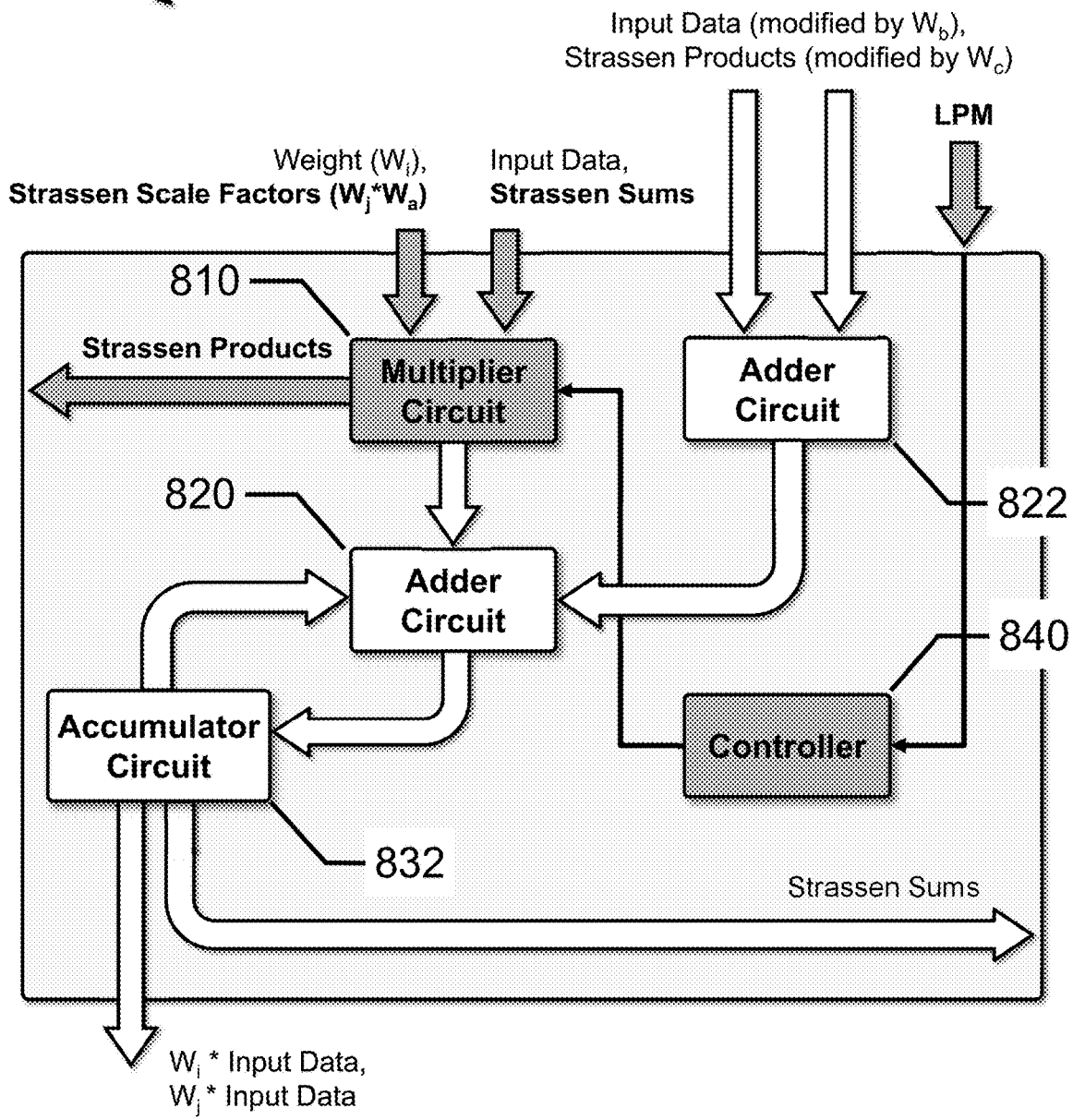

FIG. 16D depicts data flow 804-3 for the LPM operating mode, in accordance with an embodiment of the present disclosure.

For the MUL operation, for each operand pair in the sequence of operand pairs, multiplier circuit 812 multiplies the operand pair (e.g., Strassen sum and Strassen scale factor $W_j$*$W_a$) to generate an intermediate value (e.g., Strassen product), and then outputs the intermediate value (Strassen product). The Strassen products are then adjusted by Strassen weights $W_c$, and provided, as a sequences of operands, to adder circuit 822 during the next control mode operation (i.e., LPA).

Figure 16E:
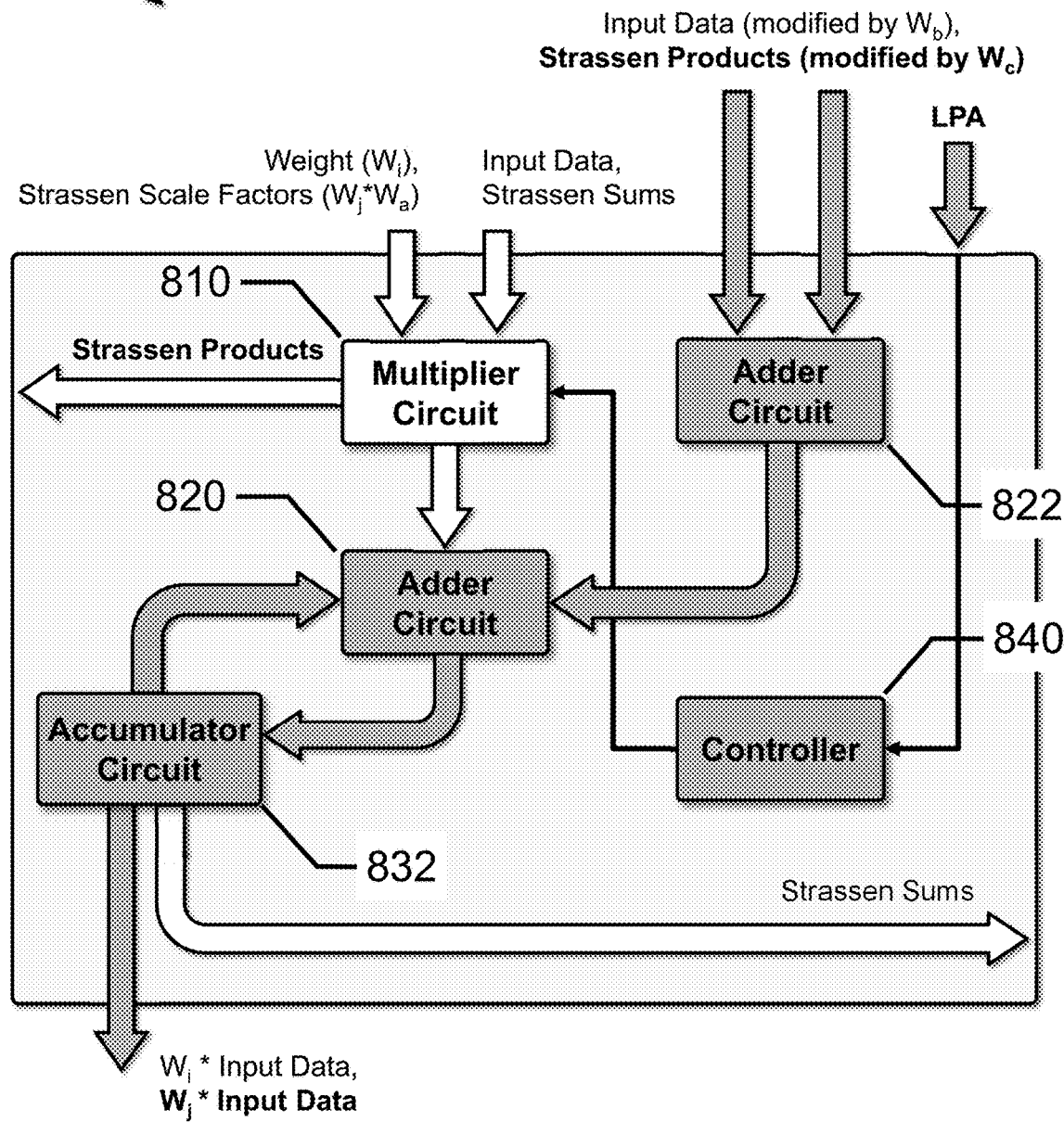

FIG. 16E depicts data flow 804-4 for the LPA operating mode, in accordance with another embodiment of the present disclosure.

For the second AAC operation, for each operand pair in the sequence of operand pairs (e.g., Strassen products that have been adjusted by Strassen weights $W_c$), adder circuit 822 adds the operand pair to generate an intermediate value. Adder circuit 820 then adds an accumulated value, received from accumulator circuit 830, to the intermediate value to generate a new accumulated value. Accumulator circuit 830 stores the new accumulated value, and, at the end of the sequence of operand pairs, accumulator circuit 830 outputs a final accumulated value (e.g., $W_j$*Input Data).

Figure 17A:
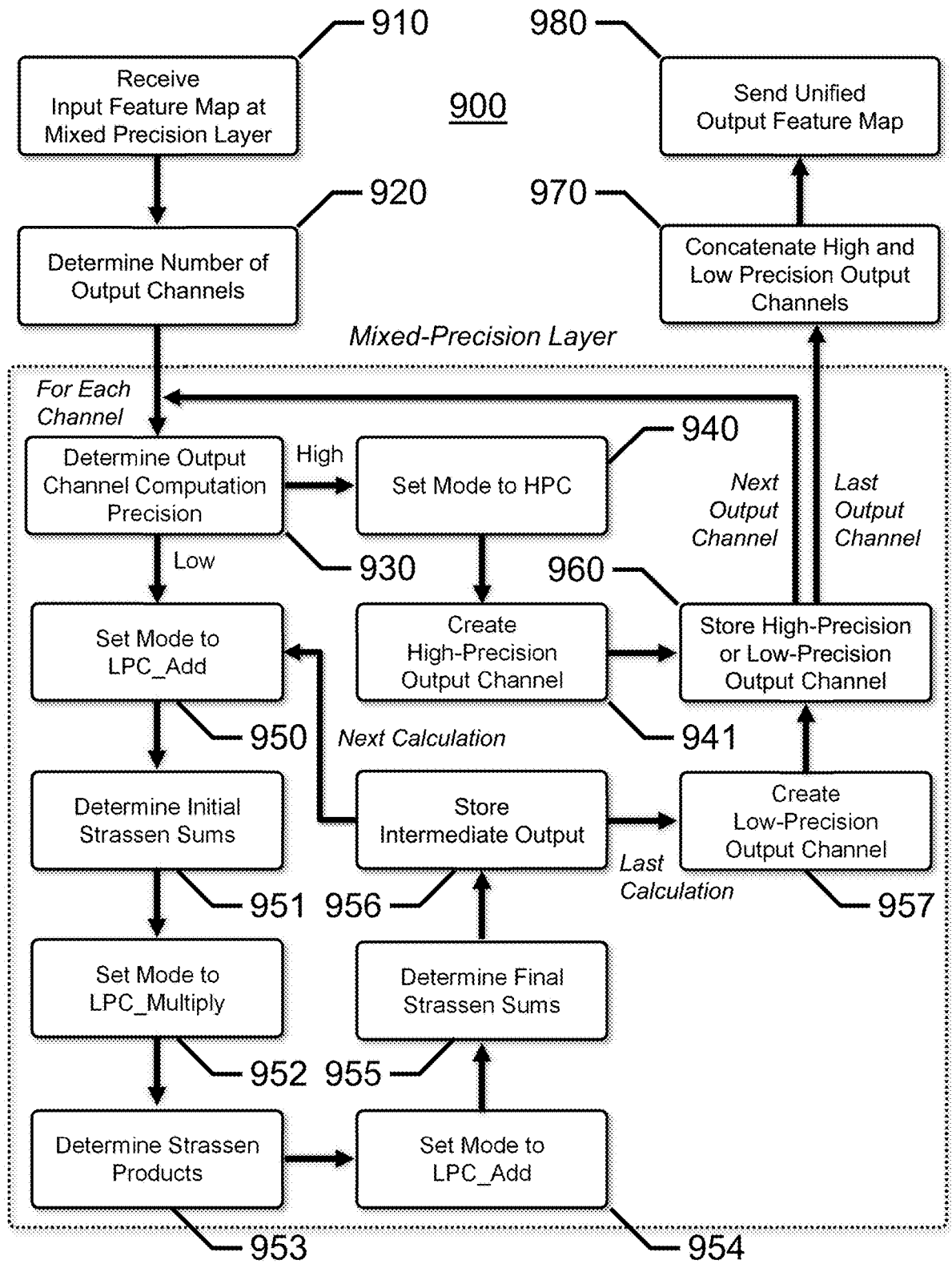
FIGS. 17A, 17B, and 17C depict flow diagrams presenting functionality for processing mixed-precision, high-precision and low-precision layers of an ANN, in accordance with an embodiment of the present disclosure.
Figure 17B:
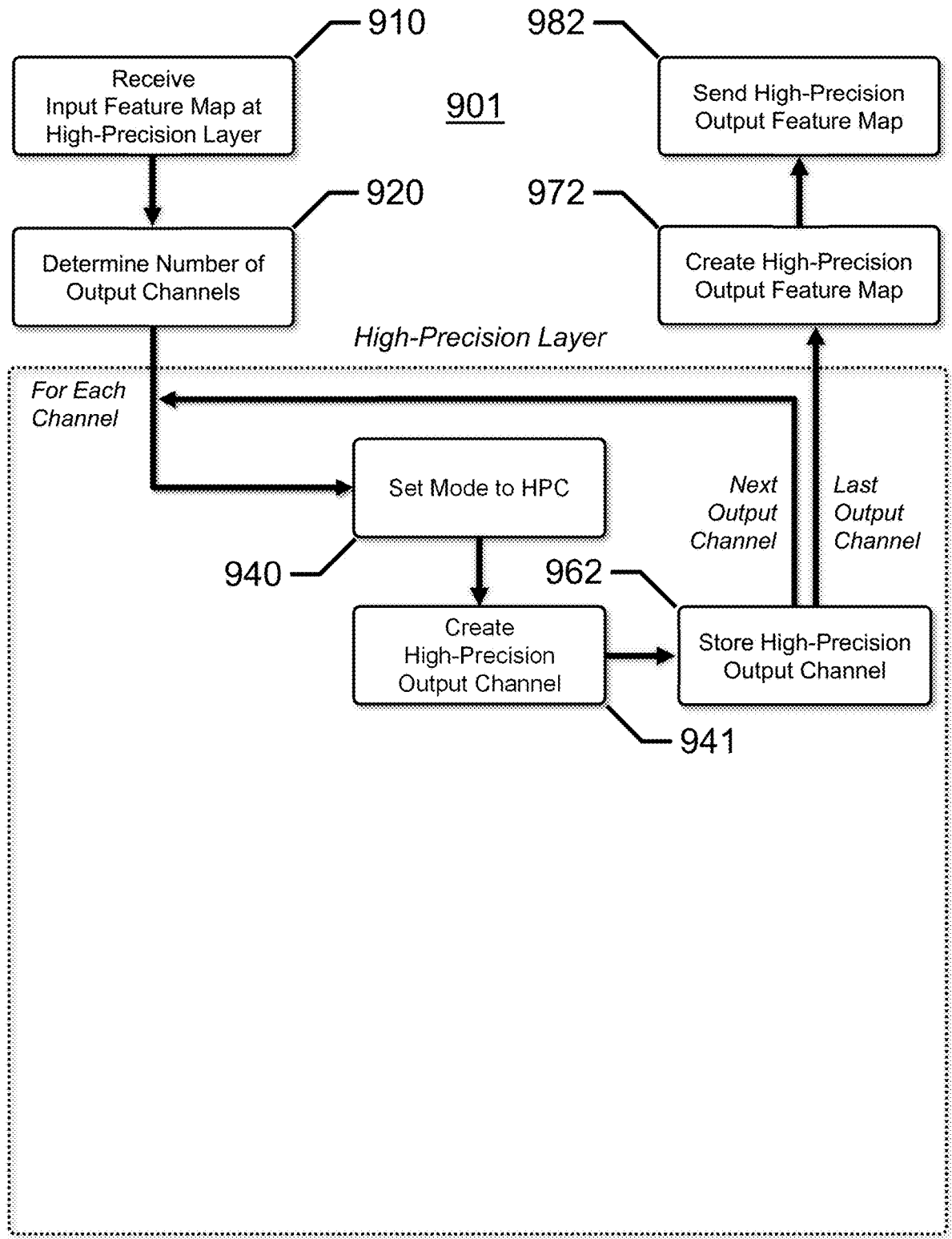
Figure 17C:
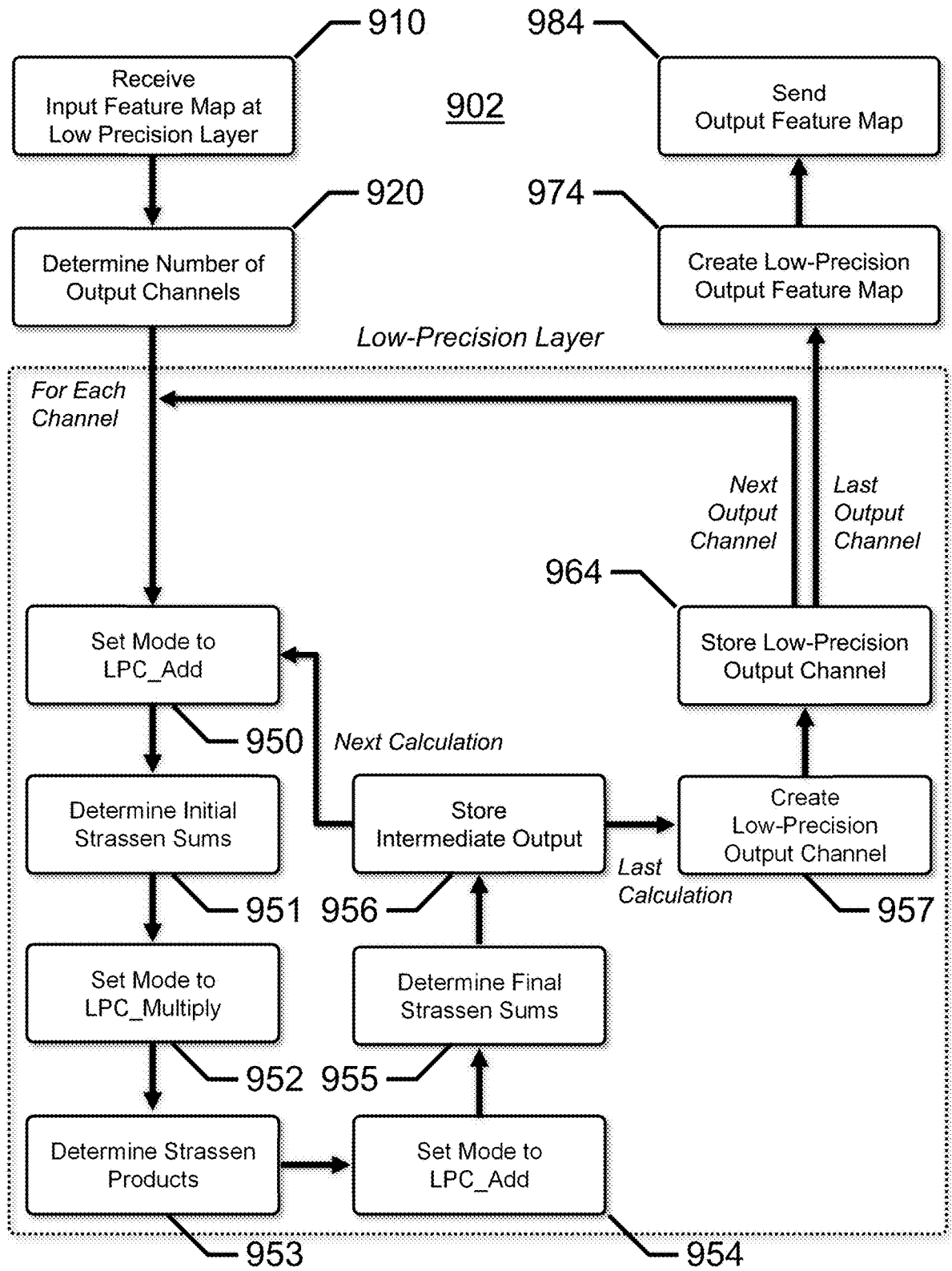

FIGS. 17A, 17B, and 17C depict flow diagrams presenting functionality for processing mixed-precision, high-precision and low-precision layers of an ANN, in accordance with an embodiment of the present disclosure.

FIG. 17A depicts flow diagram 900 presenting functionality for processing a mixed-precision layer of an ANN, in accordance with an embodiment of the present disclosure.

At 910, an input feature map is received at the mixed precision layer. In certain embodiments, other data may also be received, such as, for example, the number of output channels and their respective precision, one or more sets of weights or weight filters (e.g., $W_i$, $W_j$, etc.) for the output channels, etc. In many embodiments, the input feature map may be received at HA 170, via communication bus 110, from memory 130.

At 920, the number of output channels are determined.

The functionality at 930, 940, 941, 950, 951, 952, 953, 954, 955, 956, 957, and 960 are performed for each output channel.

At 930, the output channel computation precision is determined. When the output channel computation precision is determined to be high-precision computation (HPC), the functionality flows to 940. In certain embodiments, the high-precision computations and the low-precision computations may be performed in parallel by different MPCs 194.

At 940, the operating mode is set to HPC mode.

At 941, the high-precision output channel is created (e.g., $W_i$*Input Data), as discussed above.

At 960, the high-precision output channel is stored in memory. The functionality flows to 930 for the next output channel, or the functionality flows to 970 after the last output channel.

When the output channel calculation precision is determined to be low-precision computation (LPC) at 930, the functionality flows to 950. In this embodiment, Strassen calculations are performed and the functionalities at 950, 951, 952, 953, 954, 955, 956 are repeated for each element of the low-precision output channel.

At 950, the operating mode is set to LPC_Add mode.

At 951, the initial Strassen sums are determined, as discussed above.

At 952, the operating mode is set to LPC_Multiply.

At 953, the Strassen products are determined, as discussed above.

At 954, the operating mode is set to LPC_Add.

At 955, the final Strassen sums are determined, as discussed above.

At 956, the intermediate output (i.e., the output channel element) is stored in memory. The functionality flows to 950 for the next calculation, or the functionality flows to 957 after the last calculation.

At 957, the low-precision output channel is created from the intermediate output (e.g., $W_j$*Input Data), as discussed above.

At 960, the low-precision output channel is stored in memory. The functionality flows to 930 for the next output channel, or the functionality flows to 970 after the last output channel.

At 970, the high-precision output channels and the low-precision output channels are concatenated to create a unified output feature map.

At 980, the unified output feature map is sent. For example, the unified output feature may be sent by HA 170, via communication bus 110, to memory 130.

FIG. 17B depicts flow diagram 901 presenting functionality for processing a high-precision layer of an ANN, in accordance with an embodiment of the present disclosure.

At 910, an input feature map is received at the high-precision layer. In certain embodiments, other data may also be received, such as, for example, the number of output channels, one or more sets of weights (e.g., Wi, etc.) for each output channel, etc. For example, the input feature map may be received at HA 170, via communication bus 110, from memory 130.

At 920, the number of output channels are determined.

The functionality at 940, 941, and 962 are performed for each output channel.

At 940, the operating mode is set to HPC mode.

At 941, the high-precision output channel is created (e.g., $W_i$*Input Data), as discussed above.

At 962, the high-precision output channel is stored in memory. The functionality flows to 940 for the next output channel, or the functionality flows to 972 after the last output channel.

At 972, the high-precision output feature map is created.

At 982, the high-precision output feature map is sent. For example, the high-precision output feature may be sent by HA 170, via communication bus 110, to memory 130.

FIG. 17C depicts flow diagram 902 presenting functionality for processing a low-precision layer of an ANN, in accordance with an embodiment of the present disclosure.

At 910, an input feature map is received at the mixed precision layer. In certain embodiments, other data may also be received, such as, for example, the number of output channels, one or more sets of weights or weight filters (e.g., $W_i$, $W_j$, etc.) for each output channel, etc. For example, the input feature map may be received at HA 170, via communication bus 110, from memory 130.

At 920, the number of output channels are determined.

The functionality at 950, 951, 952, 953, 954, 955, 956, 957, and 964 are performed for each output channel. In this embodiment, Strassen calculations are performed and the functionalities at 950, 951, 952, 953, 954, 955, 956 are repeated for each element of the low-precision output channel.

At 950, the operating mode is set to LPC_Add mode.

At 951, the initial Strassen sums are determined, as discussed above.

At 952, the operating mode is set to LPC_Multiply.

At 953, the Strassen products are determined, as discussed above.

At 954, the operating mode is set to LPC_Add.

At 955, the final Strassen sums are determined, as discussed above.

At 956, the intermediate output (i.e., output channel element) is stored in memory. The functionality flows to 950 for the next calculation, or the functionality flows to 957 after the last calculation.

At 957, the low-precision output channel is created from the intermediate outputs (e.g., $W_j$*Input Data), as discussed above.

At 964, the low-precision output channel is stored in memory. The functionality flows to 950 for the next output channel, or the functionality flows to 974 after the last output channel.

At 974, the low-precision output feature map is created.

At 984, the low-precision output feature map is sent. For example, the low-precision output feature may be sent by HA 170, via communication bus 110, to memory 130.

Figure 18:
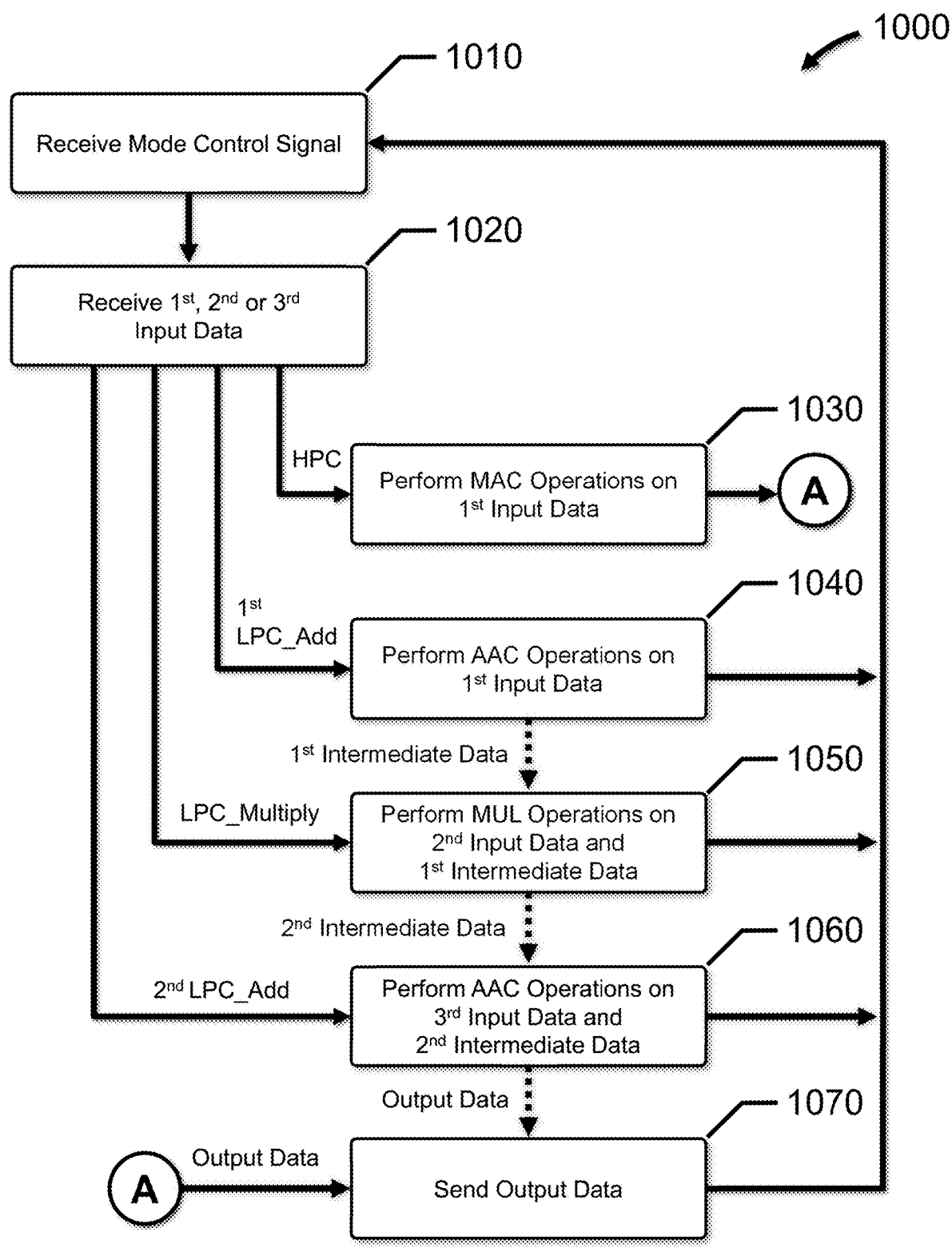
FIG. 18 depicts a flow diagram presenting functionality for mixed-precision computation (MPC) method, in accordance with an embodiment of the present disclosure.

FIG. 18 depicts a flow diagram 1000 presenting functionality for a mixed-precision computation (MPC) method, in accordance with an embodiment of the present disclosure.

At 1010, at least one mode control signal is received at MPC unit 194. In this embodiment, HA 170 includes at least one CE 180, which includes at least one MPC unit 194, which includes multiplier circuit 810, adder circuit 820, adder circuit 822, accumulator circuit 830 and controller 840. Controller 840 has a plurality of operating modes including a high precision mode, a low precision add mode and a low precision multiply mode. Other configurations for MPC unit 194 are also contemplated.

At 1020, input data are received. More particularly, first input data, second input data or third input data are received. For example, input data may be received at HA 170, via communication bus 110, from memory 130, transferred to CE 180 and then to MPC unit 194.

At 1030, in response to receiving a high precision mode control signal (HPC), multiply-and-accumulate (MAC) operations are performed on the first input data to generate output data. The functionality then flows to 1070.

At 1040, in response to receiving a first low precision add mode control signal (1st LPC_Add), add-and-accumulate (AAC) operations are performed on the first input data to generate first intermediate output data. The functionality then flows to 1010.

At 1050, in response to receiving a low precision multiply mode control signal (LPC_Multiply), multiply (MUL) operations are performed on the second input data and the first intermediate output data to generate second intermediate output data. The functionality then flows to 1010.

At 1060, in response to receiving a second low precision add mode control signal ($2^{nd}$ LPC_Add), AAC operations are performed on the second intermediate output data, based on the third input data, to generate the output data. The functionality then flows to 1070.

At 1070, the output data are sent. For example, the output may be sent from MPC unit 194 to memory 186 or memory 176 for storage. The functionality then flows to 1010.

Embodiments of the present disclosure advantageously provide a mixed-precision computation (MPC) unit for use with layer-wise hybrid filter banks for ANNs that provide start-of-the-art accuracy levels while requiring a fraction of the model size and considerably fewer MAC and multiplication operations per inference. The end-to-end learning of hybrid filter banks makes this possible by keeping precision critical convolutional filters in high-precision values and "strassenifying" quantization tolerant filters only to ternary values. The filters that are most sensitive to quantization errors perform traditional convolutions with input feature maps, whereas ternary quantization tolerant filters can perform strassenified convolutions using narrow hidden layers.

The embodiments described herein are combinable.

In one embodiment, a system includes a circuitry, configured to be coupled to a memory and a processor, to execute one or more mixed-precision layers of an artificial neural network (ANN), each mixed-precision layer including high-precision weight filters and low-precision weight filters. The circuitry is configured to receive at least a portion of an input feature map having a plurality of input channels ($c_{in}$), perform one or more calculations on the at least a portion of an input feature map using at least a portion of the high-precision weight filters to create at least a portion of a high-precision output feature map having a first number of output channels (k), perform one or more calculations on the input feature map using at least a portion of the low-precision weight filters to create at least a portion of a low-precision output feature map having a second number of output channels ($c_{out}$–k), concatenate the at least a portion of the high-precision output feature map and the at least a portion of the low-precision output feature map to create at least a portion of a unified output feature map having a plurality of output channels ($c_{out}$), and send the at least a portion of the unified output feature map.

In another embodiment of the system, each high precision weight filter includes one or more 16-bit or greater floating point weight values, and each low precision weight filter includes a scaling factor and a plurality of ternary weight values, each ternary weight value being –1, 0 or 1; or a scaling factor and a plurality of binary weight values, each binary weight value being –1 or 1.

In another embodiment of the system, the circuitry includes at least one hardware accelerator having one or more high precision computation (HPC) units and one or more low precision computation (LPC) units; each HPC unit includes one or more multiply and -accumulate (MAC) units; and each LPC unit includes one or more Strassen calculation (SC) units.

In another embodiment of the system, the circuitry includes at least one hardware accelerator having one or more mixed precision computation (MPC) units, and each MPC unit is configured to perform a MAC operation or a Strassen operation based on a mode control signal.

In one embodiment, a mixed precision computation (MPC) unit for executing one or more mixed precision layers of an artificial neural network (ANN) includes a multiplier circuit configured to input a pair of operands and output a product; a first adder circuit coupled to the multiplier circuit; a second adder circuit, coupled to the first adder circuit, configured to input a pair of operands; an accumulator circuit, coupled to the multiplier circuit and the first adder circuit, configured to output an accumulated value; and a controller, coupled to the multiplier circuit, the first adder circuit, the second adder circuit and the accumulator circuit, configured to input a mode control signal, the controller having a plurality of operating modes including a high-precision mode, a low-precision add mode and a low-precision multiply mode.

In another embodiment of the MPC unit, when the controller is operating in the high-precision mode, for each pair of operands in a sequence of input data, the multiplier circuit is configured to multiply the pair of operands to generate the product; the first adder circuit is configured to add the accumulated value, from the accumulator circuit, to the product to generate a new accumulated value; the accumulator circuit is configured to store the new accumulated value; and the accumulator circuit is further configured to output a final accumulated value after a final pair of operands in the sequence of input data has been processed.

In another embodiment of the MPC unit, when the controller is operating in the low-precision add mode, for each pair of operands in the sequence of input data, the second adder circuit is configured to add the pair of operands to generate an intermediate sum, the first adder circuit is configured to add the accumulated value, from the accumulator circuit, to the intermediate sum to generate the new accumulated value, and the accumulator circuit is configured to store the new accumulated value, and the accumulator circuit is further configured to output the final accumulated value after the final pair of operands in the sequence of input data has been processed; and when the controller is operating in the low-precision multiply mode, for each pair of operands in the sequence of input data, the multiplier circuit is configured to multiply the pair of operands to generate the product, and the multiplier circuit is configured to output a sequence of products after the final pair of operands in the sequence of input data has been processed.

In another embodiment of the MPC unit, when the controller is operating in the high-precision mode or the low-precision multiply mode, each operand is a 16-bit or greater floating point value; and when the controller is operating in the low-precision add mode, each operand is a 16-bit or greater floating point value that has been adjusted based on a ternary weight value or a binary weight value, each ternary weight value being –1, 0 or 1, and each binary weight value being –1 or 1.

In another embodiment of the MPC unit, a sign of the operand is reversed when the ternary or binary weight value is –1, the sign of the operand is not changed when the ternary or binary weight value is 1, and the operand is set to 0 when the ternary weight value is 0.

In another embodiment of the MPC unit, a multiply-and-accumulate (MAC) operation is performed when the controller is operating in the high-precision mode; and a Strassen operation is performed when the controller is operating according to a sequence of operating modes, the sequence includes a first mode, a second mode and a third mode, the first mode is the low-precision add mode, the second mode is the low-precision multiply mode, and the third mode is the low-precision add mode.

In another embodiment of the MPC unit, when the controller is operating in the first mode, initial Strassen sums are determined based on input data and Strassen weights ($W_b$); when the controller is operating in the second mode, Strassen products are determined based on the initial Strassen sums and Strassen scale factors ($W_j * W_a$); and when the controller is operating in the third mode, final Strassen sums are determined based on the Strassen products and Strassen weights ($W_c$).

In one embodiment, a mixed precision computation (MPC) method includes receiving at least one mode control signal at an MPC unit that includes a multiplier circuit, a first adder circuit, a second adder circuit, an accumulator circuit and a controller having a plurality of operating modes including a high-precision mode, a low-precision add mode and a low-precision multiply mode; receiving first input data, second input data or third input data; in response to receiving a high-precision mode control signal, performing multiply-and-accumulate (MAC) operations on the first input data to generate output data; in response to receiving a first low-precision add mode control signal, performing add-and-accumulate (AAC) operations on the first input data to generate first intermediate output data; in response to receiving a low-precision multiply mode control signal, performing multiply (MUL) operations on the second input data and the first intermediate output data to generate second intermediate output data; in response to receiving a second low-precision add mode control signal, performing AAC operations on the third input data and the second intermediate output data to generate the output data; and sending the output data.

In another embodiment of the MPC method, the first input data include feature map data and a plurality of first weights; the second input data include a plurality of second weights; and the third input data include a plurality of third weights.

In another embodiment of the MPC method, the method further includes creating a plurality of sequences of operand pairs based on the first input data, the plurality of first weights including high-precision weight values, each high-precision weight value being a 16-bit or greater floating point value, each operand pair including a first weight value and a feature map data value, where said performing MAC operations on the first input data includes, for each sequence of operand pairs, for each operand pair in the sequence of operand pairs, multiplying, by the multiplier circuit, the operand pair to generate an intermediate value, adding, by the first adder circuit, an accumulated value, from the accumulator circuit, to the intermediate value to generate a new accumulated value, and storing, by the accumulator circuit, the new accumulated value, and outputting, by the accumulator circuit, a final accumulated value after a final operand pair in the sequence of operand pairs has been processed, where the output data is formed from the final accumulated value for each sequence of operand pairs.

In another embodiment of the MPC method, the method further includes creating a plurality of sequences of operand pairs based on the first input data, the plurality of first weights including low-precision weight values, each low-precision weight value being a ternary weight value or a binary weight value, each ternary weight value being −1, 0 or 1, each binary weight value being −1 or 1, each operand pair including a pair of modified feature map data values; where said performing AAC operations on the first input data includes, for each sequence of operand pairs, for each operand pair in the sequence of operand pairs, adding, by the second adder circuit, the operand pair to generate an intermediate value, adding, by the first adder circuit, an accumulated value, from the accumulator circuit, to the intermediate value to generate a new accumulated value, and storing, by the accumulator circuit, the new accumulated value, and outputting, by the accumulator circuit, a final accumulated value after a final operand pair in the sequence of operand pairs has been processed, where the first intermediate output data is formed from the final accumulated value for each sequence of operand pairs.

In another embodiment of the MPC method, creating the plurality of sequences of operand pairs includes associating each ternary weight value or binary weight value with a feature map data value; modifying each feature map data value by reversing a sign of the feature map data value when an associated ternary or binary weight value is −1, not changing the sign of the feature map data value when the associated ternary or binary weight value is 1, and setting the feature map data value to 0 when the associated ternary weight value is 0; and forming each operand pair from a pair of modified feature map data values.

In another embodiment of the MPC method, the method further includes creating a sequence of operand pairs based on the second input data and the first intermediate output data, the plurality of second weights including high-precision weight values, each high-precision weight value being a 16-bit or greater floating point value, each operand pair including a second weight value and a first intermediate output data value, where said performing MUL operations on the second input data and the first intermediate output data includes, for each operand pair in the sequence of operand pairs, multiplying, by the multiplier circuit, the operand pair to generate the intermediate value, and outputting, by the multiplier circuit, the intermediate value, where the second intermediate output data is formed from the intermediate value for each operand pair in the sequence of operand pairs.

In another embodiment of the MPC method, the method further includes creating an additional plurality of sequences of operand pairs based on the third input data and the second intermediate output data, the plurality of third weights including low-precision weight values, each low-precision weight value being a ternary weight value or a binary weight value, each operand pair including a pair of modified second intermediate output data values, where said performing AAC operations based on the third input data and the second intermediate output data includes, for each sequence of operand pairs, for each operand pair in the sequence of operand pairs, adding, by the second adder circuit, the operand pair to generate the intermediate value, adding, by the first adder circuit, the accumulated value, from the accumulator circuit, to the intermediate value to generate the new accumulated value, and storing, by the accumulator circuit, the new accumulated value, and outputting, by the accumulator circuit, the final accumulated value after the final operand pair in the sequence of operand pairs has been processed, where the output data is formed from the final accumulated value for each sequence of operand pairs.

In another embodiment of the MPC method, said creating an additional plurality of sequences of operand pairs includes associating each ternary weight value or binary weight value with a second intermediate output data value; modifying each second intermediate output data value by reversing a sign of the second intermediate output data value when an associated ternary or binary weight value is −1, not changing the sign of the second intermediate output data value when the associated ternary or binary weight value is 1, and setting the second intermediate output data value to 0 when the associated ternary weight value is 0; and forming each operand pair from a pair of modified second intermediate output data values.

In another embodiment of the MPC method, performing MAC operations on the first input data produces output feature map data; said performing AAC operations on the first input data produces initial Strassen sums based on the feature map data and first Strassen weights ($W_b$); said performing MUL operations on the second input data and the first intermediate output data produces Strassen products based on the initial Strassen sums and Strassen scale factors ($W_j*W_a$); and said performing AAC operations on the third input data and the second intermediate output data produces final Strassen sums based on the Strassen products and second Strassen weights ($W_c$), the final Strassen sums being output feature map data.

While implementations of the disclosure are susceptible to embodiment in many different forms, there is shown in the drawings and will herein be described in detail specific embodiments, with the understanding that the present disclosure is to be considered as an example of the principles of the disclosure and not intended to limit the disclosure to the specific embodiments shown and described. In the description above, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," "for example," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus, device, system, etc. may be used interchangeably in this text.

The many features and advantages of the disclosure are apparent from the detailed specification, and, thus, it is intended by the appended claims to cover all such features and advantages of the disclosure which fall within the scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A system, comprising:
a circuitry, configured to be coupled to a memory and a processor, to execute one or more mixed-precision layers of an artificial neural network (ANN), each mixed-precision layer including high-precision weight filters and low-precision weight filters, the circuitry configured to:
receive at least a portion of an input feature map having a plurality of input channels ($c_{in}$),
perform one or more calculations on the at least a portion of an input feature map using at least a portion of the high-precision weight filters to create at least a portion of a high-precision output feature map having a first number of output channels (k),
perform one or more calculations on the input feature map using at least a portion of the low-precision weight filters to create at least a portion of a low-precision output feature map having a second number of output channels ($c_{out}$-k),
concatenate the at least a portion of the high-precision output feature map and the at least a portion of the low-precision output feature map to create at least a portion of a unified output feature map having a plurality of output channels ($c_{out}$), and
send the at least a portion of the unified output feature map.

2. The system of claim 1, where each high-precision weight filter includes one or more 16-bit or greater floating point weight values, and each low-precision weight filter includes:
a scaling factor and a plurality of ternary weight values, each ternary weight value being −1, 0 or 1; or
a scaling factor and a plurality of binary weight values, each binary weight value being −1 or 1.

3. The system of claim 1, where:
the circuitry includes at least one hardware accelerator having one or more high-precision computation (HPC) units and one or more low-precision computation (LPC) units;
each HPC unit includes one or more multiply-and-accumulate (MAC) units; and
each LPC unit includes one or more Strassen calculation (SC) units.

4. The system of claim 1, where the circuitry includes at least one hardware accelerator having one or more mixed-precision computation (MPC) units, and each MPC unit is configured to perform a MAC operation or a Strassen operation based on a mode control signal.

5. A mixed-precision computation (MPC) unit for executing one or more mixed-precision layers of an artificial neural network (ANN), comprising:
a multiplier circuit configured to input a pair of operands and output a product;
a first adder circuit coupled to the multiplier circuit;
a second adder circuit, coupled to the first adder circuit, configured to input a pair of operands;
an accumulator circuit, coupled to the multiplier circuit and the first adder circuit, configured to output an accumulated value; and a controller, coupled to the multiplier circuit, the first adder circuit, the second adder circuit and the accumulator circuit, having a plurality of operating modes including a high-precision mode, a low-precision add mode and a low-precision multiply mode, the controller configured to:

in response to receiving a high-precision mode control signal, controlling multiply-and-accumulate (MAC) operations on first input data to generate output data, in response to receiving a first low-precision add mode control signal, controlling add-and-accumulate (AAC) operations on the first input data to generate first intermediate output data, in response to receiving a low-precision multiply mode control signal, controlling multiply (MUL) operations on second input data and the first intermediate output data to generate second intermediate output data, and in response to receiving a second low-precision add mode control signal, controlling AAC operations on third input data and the second intermediate output data to generate the output data.

6. The MPC unit of claim 5, where, when the controller is operating in the high-precision mode:

for each pair of operands in a sequence of input data:
the multiplier circuit is configured to multiply the pair of operands to generate the product;
the first adder circuit is configured to add the accumulated value, from the accumulator circuit, to the product to generate a new accumulated value;
the accumulator circuit is configured to store the new accumulated value; and
the accumulator circuit is further configured to output a final accumulated value after a final pair of operands in the sequence of input data has been processed.

7. The MPC unit of claim 6, where:

when the controller is operating in the low-precision add mode:
for each pair of operands in the sequence of input data:
the second adder circuit is configured to add the pair of operands to generate an intermediate sum,
the first adder circuit is configured to add the accumulated value, from the accumulator circuit, to the intermediate sum to generate the new accumulated value, and
the accumulator circuit is configured to store the new accumulated value, and
the accumulator circuit is further configured to output the final accumulated value after the final pair of operands in the sequence of input data has been processed; and
when the controller is operating in the low-precision multiply mode:
for each pair of operands in the sequence of input data,
the multiplier circuit is configured to multiply the pair of operands to generate the product, and
the multiplier circuit is configured to output a sequence of products after the final pair of operands in the sequence of input data has been processed.

8. The MPC unit of claim 7, where:

when the controller is operating in the high-precision mode or the low-precision multiply mode, each operand is a 16-bit or greater floating point value; and
when the controller is operating in the low-precision add mode, each operand is a 16-bit or greater floating point value that has been adjusted based on a ternary weight value or a binary weight value, each ternary weight value being −1, 0 or 1, and each binary weight value being −1 or 1.

9. The MPC unit of claim 8, where a sign of the operand is reversed when the ternary or binary weight value is −1, the sign of the operand is not changed when the ternary or binary weight value is 1, and the operand is set to 0 when the ternary weight value is 0.

10. The MPC unit of claim 5, where:

a multiply-and-accumulate (MAC) operation is performed when the controller is operating in the high-precision mode; and
a Strassen operation is performed when the controller is operating according to a sequence of operating modes, the sequence includes a first mode, a second mode and a third mode, the first mode is the low-precision add mode, the second mode is the low-precision multiply mode, and the third mode is the low-precision add mode.

11. The MPC unit of claim 10, where:

when the controller is operating in the first mode, initial Strassen sums are determined based on input data and Strassen weights ($W_b$);
when the controller is operating in the second mode, Strassen products are determined based on the initial Strassen sums and Strassen scale factors ($W_j * W_a$); and
when the controller is operating in the third mode, final Strassen sums are determined based on the Strassen products and Strassen weights ($W_c$).

12. A mixed-precision computation (MPC) method, comprising:

receiving at least one mode control signal at an MPC unit that includes a multiplier circuit, a first adder circuit, a second adder circuit, an accumulator circuit and a controller having a plurality of operating modes including a high-precision mode, a low-precision add mode and a low-precision multiply mode;
receiving first input data, second input data or third input data;
in response to receiving a high-precision mode control signal, performing multiply-and-accumulate (MAC) operations on the first input data to generate output data;
in response to receiving a first low-precision add mode control signal, performing add-and-accumulate (AAC) operations on the first input data to generate first intermediate output data;
in response to receiving a low-precision multiply mode control signal, performing multiply (MUL) operations on the second input data and the first intermediate output data to generate second intermediate output data;
in response to receiving a second low-precision add mode control signal, performing AAC operations on the third input data and the second intermediate output data to generate the output data; and
sending the output data.

13. The MPC method of claim 12, where:

the first input data include feature map data and a plurality of first weights;
the second input data include a plurality of second weights; and
the third input data include a plurality of third weights.

14. The MPC method of claim 13, further comprising:

creating a plurality of sequences of operand pairs based on the first input data, the plurality of first weights including high-precision weight values, each high-precision weight value being a 16-bit or greater floating point value, each operand pair including a first weight value and a feature map data value, where said performing MAC operations on the first input data includes:
for each sequence of operand pairs:
for each operand pair in the sequence of operand pairs:
multiplying, by the multiplier circuit, the operand pair to generate an intermediate value,
adding, by the first adder circuit, an accumulated value, from the accumulator circuit, to the intermediate value to generate a new accumulated value, and
storing, by the accumulator circuit, the new accumulated value, and
outputting, by the accumulator circuit, a final accumulated value after a final operand pair in the sequence of operand pairs has been processed,
where the output data is formed from the final accumulated value for each sequence of operand pairs.

15. The MPC method of claim 13, further comprising:
creating a plurality of sequences of operand pairs based on the first input data, the plurality of first weights including low-precision weight values, each low-precision weight value being a ternary weight value or a binary weight value, each ternary weight value being −1, 0 or 1, each binary weight value being −1 or 1, each operand pair including a pair of modified feature map data values;
where said performing AAC operations on the first input data includes:
for each sequence of operand pairs:
for each operand pair in the sequence of operand pairs:
adding, by the second adder circuit, the operand pair to generate an intermediate value,
adding, by the first adder circuit, an accumulated value, from the accumulator circuit, to the intermediate value to generate a new accumulated value, and
storing, by the accumulator circuit, the new accumulated value, and
outputting, by the accumulator circuit, a final accumulated value after a final operand pair in the sequence of operand pairs has been processed,
where the first intermediate output data is formed from the final accumulated value for each sequence of operand pairs.

16. The MPC method of claim 15, where said creating the plurality of sequences of operand pairs includes:
associating each ternary weight value or binary weight value with a feature map data value;
modifying each feature map data value by reversing a sign of the feature map data value when an associated ternary or binary weight value is −1, not changing the sign of the feature map data value when the associated ternary or binary weight value is 1, and setting the feature map data value to 0 when the associated ternary weight value is 0; and
forming each operand pair from a pair of modified feature map data values.

17. The MPC method of claim 16, further comprising:
creating a sequence of operand pairs based on the second input data and the first intermediate output data, the plurality of second weights including high-precision weight values, each high-precision weight value being a 16-bit or greater floating point value, each operand pair including a second weight value and a first intermediate output data value, where said performing MUL operations on the second input data and the first intermediate output data includes:
for each operand pair in the sequence of operand pairs:
multiplying, by the multiplier circuit, the operand pair to generate the intermediate value, and
outputting, by the multiplier circuit, the intermediate value,
where the second intermediate output data is formed from the intermediate value for each operand pair in the sequence of operand pairs.

18. The MPC method of claim 17, further comprising:
creating an additional plurality of sequences of operand pairs based on the third input data and the second intermediate output data, the plurality of third weights including low-precision weight values, each low-precision weight value being a ternary weight value or a binary weight value, each operand pair including a pair of modified second intermediate output data values,
where said performing AAC operations based on the third input data and the second intermediate output data includes:
for each sequence of operand pairs:
for each operand pair in the sequence of operand pairs:
adding, by the second adder circuit, the operand pair to generate the intermediate value,
adding, by the first adder circuit, the accumulated value, from the accumulator circuit, to the intermediate value to generate the new accumulated value, and
storing, by the accumulator circuit, the new accumulated value, and
outputting, by the accumulator circuit, the final accumulated value after the final operand pair in the sequence of operand pairs has been processed,
where the output data is formed from the final accumulated value for each sequence of operand pairs.

19. The MPC method of claim 18, where said creating an additional plurality of sequences of operand pairs includes:
associating each ternary weight value or binary weight value with a second intermediate output data value;
modifying each second intermediate output data value by reversing a sign of the second intermediate output data value when an associated ternary or binary weight value is −1, not changing the sign of the second intermediate output data value when the associated ternary or binary weight value is 1, and setting the second intermediate output data value to 0 when the associated ternary weight value is 0; and
forming each operand pair from a pair of modified second intermediate output data values.

20. The MPC method of claim 19, where:
said performing MAC operations on the first input data produces output feature map data;
said performing AAC operations on the first input data produces initial Strassen sums based on the feature map data and first Strassen weights ($W_b$);
said performing MUL operations on the second input data and the first intermediate output data produces Strassen products based on the initial Strassen sums and Strassen scale factors ($W_j * W_a$); and
said performing AAC operations on the third input data and the second intermediate output data produces final Strassen sums based on the Strassen products and second Strassen weights ($W_c$), the final Strassen sums being output feature map data.

* * * * *